United States Patent
Zhu et al.

(10) Patent No.: US 12,552,852 B2
(45) Date of Patent: Feb. 17, 2026

(54) CHIMERIC ANTIGEN RECEPTOR T LYMPHOCYTE FOR TREATING TUMORS, PREPARATION METHOD THEREFOR, AND USE THEREOF

(71) Applicant: CARBIOGENE THERAPEUTICS CO.LTD, Hangzhou (CN)

(72) Inventors: Jiangao Zhu, Hangzhou (CN); Wenjun Yang, Hangzhou (CN)

(73) Assignee: CARBIOGENE THERAPEUTICS CO. LTD, Hangzhou (CN)

( * ) Notice: Subject to any disclaimer, the term of this patent is extended or adjusted under 35 U.S.C. 154(b) by 1089 days.

(21) Appl. No.: 17/469,830

(22) Filed: Sep. 8, 2021

(65) Prior Publication Data
US 2021/0401890 A1     Dec. 30, 2021

Related U.S. Application Data

(63) Continuation-in-part of application No. PCT/CN2020/097946, filed on Jun. 24, 2020.

(30) Foreign Application Priority Data

Jun. 25, 2019 (CN) .......................... 201910555126.8
May 28, 2020 (CN) .......................... 202010466592.1

(51) Int. Cl.
C07K 14/705 (2006.01)
A61K 38/00 (2006.01)
A61K 40/11 (2025.01)
A61K 40/31 (2025.01)
A61K 40/42 (2025.01)
A61P 35/00 (2006.01)
C07K 14/715 (2006.01)
C07K 16/28 (2006.01)

(52) U.S. Cl.
CPC ........ *C07K 14/70517* (2013.01); *A61K 40/11* (2025.01); *A61K 40/31* (2025.01); *A61K 40/421* (2025.01); *A61K 40/4215* (2025.01); *A61P 35/00* (2018.01); *C07K 14/70575* (2013.01); *C07K 14/70578* (2013.01); *C07K 14/7153* (2013.01); *C07K 16/2803* (2013.01); *C07K 16/2878* (2013.01); *A61K 38/00* (2013.01); *A61K 2239/31* (2023.05); *A61K 2239/38* (2023.05); *A61K 2239/48* (2023.05); *C07K 2317/53* (2013.01); *C07K 2317/622* (2013.01)

(58) Field of Classification Search
CPC ................................ A61K 39/4631
See application file for complete search history.

(56) References Cited

U.S. PATENT DOCUMENTS 11,161,907 B2 * 11/2021 June ................... A61K 39/4631

FOREIGN PATENT DOCUMENTS

| CN | 107188968 A | 9/2017 |
|---|---|---|
| CN | 108018299 A | 5/2018 |
| CN | 108395478 A | 8/2018 |
| CN | 108822216 A | 11/2018 |
| CN | 109320615 A | 2/2019 |
| CN | 109485733 A | 3/2019 |
| WO | 2020047306 A1 | 3/2020 |

OTHER PUBLICATIONS

Wang, Jun, et al. "Siglec-15 as an immune suppressor and potential target for normalization cancer immunotherapy." Nature medicine 25.4 (2019): 656-666. (Year: 2019).*
Ramakrishna, Venky, et al. "Characterization of the human T cell response to in vitro CD27 costimulation with varlilumab." Journal for immunotherapy of cancer 3 (2015): 1-13. (Year: 2015).*
International Search Report issued in corresponding International Application No. PCT/CN2020/097946; mailed Oct. 9, 2020; State Intellectual Property Office of the P.R. China, Beijing, China, 10 pgs.
First Office Action issued in corresponding Chinese Application No. 202010466592.1; mailed Dec. 22, 2020; State Intellectual Property Office of the P.R. China, Beijing, China, 14 pgs.
First Office Action issued in corresponding Chinese Application No. 201910555126.8; mailed Dec. 24, 2020; State Intellectual Property Office of the P.R. China, Beijing, China, 20 pgs.
De-Gang Song et al., "Pro-survival Signaling via CD27 Costimulation Drives Effective CAR T-cell Therapy"; OncoImmunology, vol. 1, No. 4, Jul. 1, 2012; 4 pgs.

* cited by examiner

*Primary Examiner* — Robert J Yamasaki
(74) *Attorney, Agent, or Firm* — HAUPTMAN HAM, LLP

(57) ABSTRACT

Provided are a chimeric antigen receptor T lymphocyte for treating tumors, a preparation method therefor, and the use thereof. The chimeric antigen receptor successively comprises a single-chain antibody against a tumor cell surface antigen, a human hinge transmembrane region, a human intracellular signal domain, a self-cleaving peptide, and the full length of human CD27. The human intracellular signal domain comprises a human intracellular co-stimulatory signal domain and a human intracellular signaling domain. The method for preparing the chimeric antigen receptor T lymphocyte comprises the following steps: introducing the coding gene of the above-mentioned chimeric antigen receptor into a T cell and expressing the coding gene, thereby obtaining the CAR-T cell.

2 Claims, 7 Drawing Sheets

Specification includes a Sequence Listing.

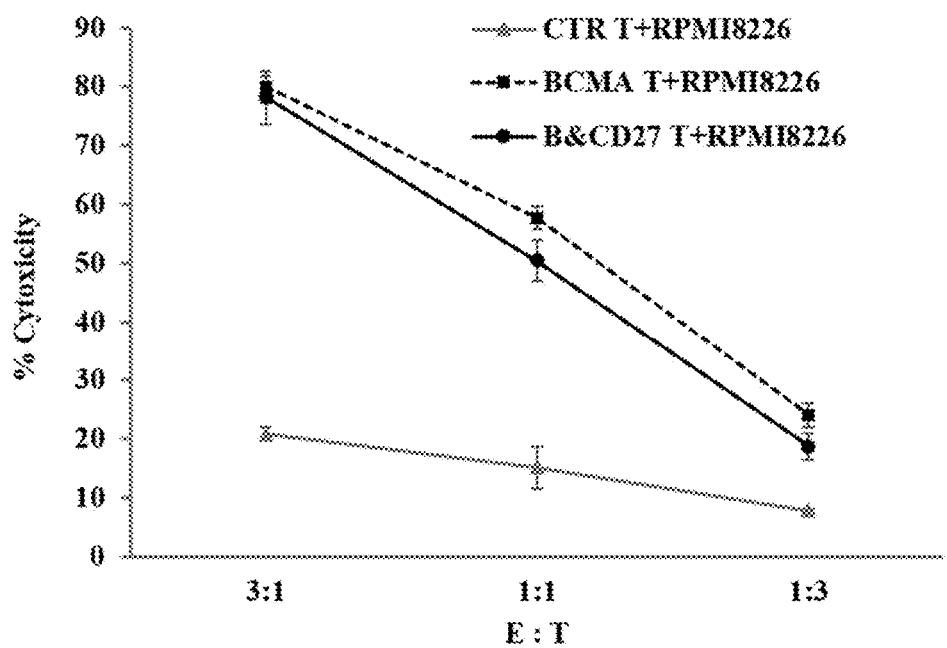
Figure 11
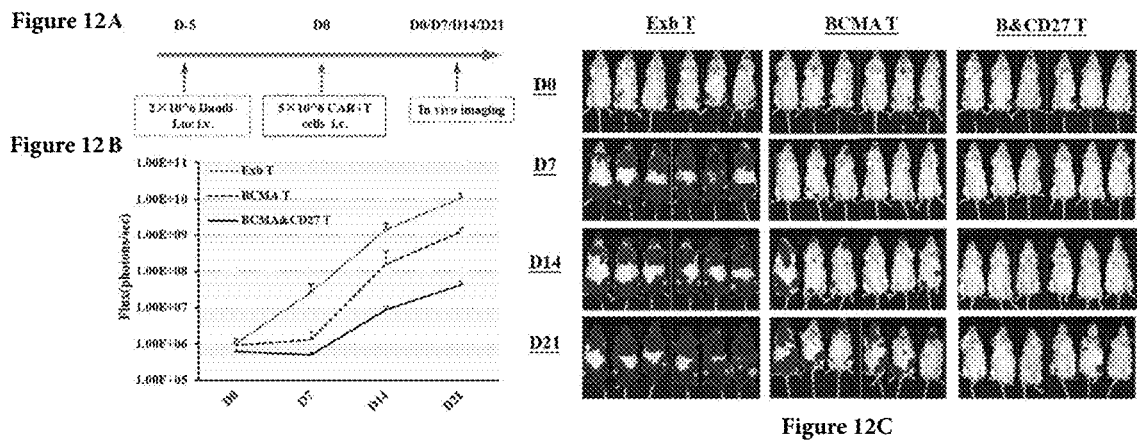
Figure 12A
Figure 12B
Figure 12C
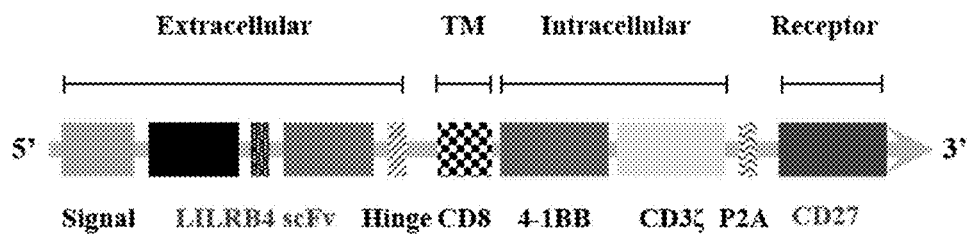
Figure 13

CHIMERIC ANTIGEN RECEPTOR T LYMPHOCYTE FOR TREATING TUMORS, PREPARATION METHOD THEREFOR, AND USE THEREOF

RELATED APPLICATIONS

The present application is a Continuation in Part of International Application Number PCT/CN2020/097946 filed Jun. 24, 2020, which claims priority to Chinese Application Numbers CN201910555126.8 filed Jun. 25, 2019 and CN202010466592.1 filed May 28, 2020, the disclosures of which are hereby incorporated by reference herein in their entireties.

INCORPORATION BY REFERENCE

The sequence listing provided in the file entitled Amended_SQL_PCT2020097946_rev1.txt, which is an ASCII text file that was created on Sep. 3, 2021, and which comprises 45,729 bytes, is hereby incorporated by reference in its entirety.

TECHNICAL FIELD

The present disclosure relates to biomedical technology, specifically relates to chimeric antigen receptor (CAR) T cells for tumor treatment and its preparation method and applications more specifically a kind of chimeric antigen receptor, chimeric antigen receptor T cells for tumor treatment and its preparation method and applications.

BACKGROUND

As research on the mechanism of T cells tumor immune response gains more and more attention, the chimeric antigen receptor (CAR)-T cell therapy is emerging as a novel immunotherapeutic strategy for cancer. The recognition specificity of T cells to target cells depends on T cells receptors (T Cell Receptor, TCR), therefore, single-chain antibody fragments (scFv) against tumor associated antigens are fused with intracellular signal activation motifs of T cells receptors such as CD3ζ or FcεRIγ to form a chimeric antigen receptor (CAR)). The CAR gene is then transferred into T cells and expressed on the surface of T cells through genetic engineering technologies, such as retrovirus-based transduction, etc. When administered into patients, the CAR-T cells can selectively target tumor cells and induce cytotoxic effects in an MHC-independent manner.

The CAR-T cells mediated immune response is its primary mechanisms to eliminate tumor cells. In normal process of immune response, antigen-specific T cells require the stimulus of at least two signals to proliferate and produce an immune response to the antigen. The first signal is mediated by the antigen-binding TCR and CD3 intracellular ITAM domain (CD3ζ); the second signal is mediated by costimulatory receptors on the surface of T cells or antigen-presenting cells (APCs), including CD28, CD137, CD134, and CD27, etc. The principle of CAR design is to mimic the immunological features of T cell activation. The structure of CAR includes an extracellular binding domain, a transmembrane domain, and an intracellular signaling domain. Usually, the extracellular region contains scFv that can recognize tumor-associated antigens. The transmembrane region is the transmembrane regions of CD8, CD28, etc. The intracellular signal domain adopts Immunoreceptor tyrosine activation motif (ITAM) CD3ζ and the intracellular signal regions of the costimulatory receptors, such as CD28, CD137, CD134, etc.

Since the first appearance of CAR-T in the early 1990s, the design of CAR has experienced the evolution of four generations in decades. Currently, the optimization of the CAR gene has been mainly focused on two aspects: first, the selection of TAAs by which CAR-T cells target tumor cells; second, the structure of CAR intracellular signal domains, including the intracellular signal transduction domain and/or the costimulatory signal domain. The specificity of CAR-T cells to tumor cells is under main consideration in the selection process of TAA. An ideal TAA for CAR-T therapy should be able to maximize the affinity of CAR-T to tumor cells and minimize off-target toxicity to normal tissue cells. Therefore, TAAs with high specific expression in tumor cells and low expression in normal cells will be selected in most cases. On the other hand, by integrating the costimulatory signal domains, the cytotoxicity and durability of CAR-T cells can be further improved. For example, the typical 2nd generation CAR structure has integrated the intracellular signal region of CD28 or CD137 (also named as 4-1BB). Since 2010, the clinical reports based on the second generation of CAR-T therapy has raised great interest in its application for cancer patients, especially for patients with relapsed and refractory acute lymphoblastic leukemia (ALL), showing the complete remission rate (CRR) of over 90%.

The safety and efficacy of CAR-T cell therapy is of great concern in this area. Most of the CAR-T cell therapies currently used in clinic are designed based on the second generation of CAR, which is effective in treating hematological malignancies, but there are still several problems to be resolved: first, the in-vivo proliferation and durability of CAR-T cells is not good enough, causing high recurrence rate of cancer after infusion; second, adverse effects caused by CAR-T, such as cytokine release syndrome and central nervous system toxicity, have led to a series of safety concerns; finally, the overall response rate of CAR-T cells in solid tumors is poor. However, higher response could not be achieved by simply increasing the dosage of CAR-T cells, because this will induce more adverse effects and result in irreversible harm to patients. Therefore, it is urgent to update the design of CAR, so as to further improve the safety and efficacy of CAR-T therapy.

DISCLOSURE OF INVENTION

The present disclosure has provided a chimeric antigen receptor, chimeric antigen receptor T lymphocytes for tumor treatment and its preparation method and application thereof.

To achieve the above purpose, this disclosure provides a chimeric antigen receptor (CAR).

The CAR comprises successively a single chain antibody fragment (scFv) against tumor associated antigen, a transmembrane domain and a intracellular signaling domain, self-cleavage peptide and a full length CD27.

The above-mentioned intracellular signaling domain includes an intracellular costimulatory signal domain and an intracellular signal transduction domain.

In the above-mentioned chimeric antigen receptor, the tumor associated antigen may be any tumor associated antigen or fragment or modification or derivative thereof known in the prior art. In various embodiments, the tumor associated antigen include but not limited to the following proteins: CD19 (NP_001171569.1, PRI 24 May 2020), CD20 (NP_068769.2, PRI 24 Apr. 2020), CD22 (NP_001762.2, PRI 25 Apr. 2020), CD30 (NP_001234.3, PRI 7 Jun. 2020), CD33 (NP_001763.3, PRI 25 Apr. 2020), CD38 (NP_001766.2, PRI 24 May 2020), BCMA (NP_001183.2, PRI 24 May 2020), Siglec-15 (NP_998767.1, PRI 7 Jun. 2020), CS1 (NP_067004.3, PRI 8 May 2020), CD138 (NP_001006947.1, PRI 31 May 2020), CD123/IL3Rα (NP_002174.1, PRI 7 Jun. 2020), c-Met (NP_001120972.1, PRI 7 Jun. 2020), gp100 (NP_001186983.1, PRI 2 May 2020), MUC1 (NP_002447.4, PRI 12 May 2020), IGF-I (NP_001104753.1, PRI 31 May 2020), EPCAM (NP_002345.2, PRI 7 Jun. 2020), EGFR/EGFRvIII (NP_001333870.1, PRI 7 Jun. 2020), HER2 (NP_004439.2, PRI 9 Jun. 2020), PD1 (NP_005009.2, PRI 7 Jun. 2020), CTLA4 (NP_005205.2, PRI 14 Jun. 2020), IGF1R (NP_000866.1, PRI 14 Jun. 2020), mesothelin (NP_001170826.1, PRI 31 May 2020), PSMA (NP_004467.1, PRI 31 May 2020), WT1 (NP_077744.4, PRI 13 May 2020), ROR1 (NP_005003.2, PRI 24 May 2020), CEA (NP_004354.3, PRI 14 Jun. 2020), NY-ESO-1 (NP_001318.1, PRI 24 May 2020), GD-2 (CAS #65988-71-8, $C_{78}H_{138}N_4O_{34}\cdot 2NH_3$), MAGE A3 (NP_005353.1, PRI 9 May 2020), GPC3 (NP_001158089.1, PRI 12 May 2020), Claudin18.2 (NP_001002026.1, PRI 26 Apr. 2020), LILRB4. In one embodiment, the tumor associated antigen is Siglec-15, and the scFv against tumor associated antigen is anti-Siglec-15 scFv (abbreviated as S15 scFv). In another embodiment, the scFv against tumor associated antigen is BCMA, and the scFv is anti-BCMA single-chain antibody (abbreviated as BCMA scFv). In another embodiment, the scFv against tumor associated antigen is LILRB4, and the scFv is anti-LILRB4 single-chain antibody (abbreviated as LILRB4 scFv).

In the above-mentioned CAR, the transmembrane region can be human hinge transmembrane region, such as the human CD8 hinge transmembrane region, the human CD28 hinge transmembrane region or the human CD4 hinge transmembrane region. In one embodiment, the transmembrane region is the human CD8 hinge transmembrane region.

The above-mentioned intracellular costimulatory signal domain is human intracellular costimulatory signal domain and it can be selected from any one intracellular region of the following molecules: CD28 (NP_006130.1, PRI 7 Jun. 2020), 4-1BB (CD137, NP 001552.2, PRI 12 May 2020), CD134 (OX40, NP 003318.1, PRI 7 Jun. 2020), CD30 (NP_001234.3, PRI 7 Jun. 2020), CD40 (NP_001241.1, PRI 17 May 2020), PD-1 (NP_005009.2, PRI 7 Jun. 2020), LFA-1 (NP_000202.3, PRI 17 May 2020), CD2 (NP_001315538.1, PRI 29 Sep. 2019), CD7 (NP_006128.1, PRI 9 May 2020), LIGHT (NP_003798.2, PRI 7 May 2020), NKG2C (NP_002251.2, PRI 27 Apr. 2020), B7-H3 (NP_001019907.1, PRI 24 May 2020). In one embodiment, the intracellular costimulatory signal domain thereof is the intracellular region of human 4-1BB protein.

The above-mentioned intracellular signal transduction domain thereof is human intracellular signal transduction domain and it can be selected from any one intracellular region of the following molecules: CD3ζ (NP_932170.1, PRI 13 May 2020), CD3 gamma (NP_000064.1, PRI 13 May 2020), CD3 delta (NP_000723.1, PRI 13 May 2020), CD3 epsilon (NP_031674.1, ROD 7 Apr. 2020), common FcR gamma (NP_000560.7, PRI 24 May 2020), FcR beta (NP_001231682.2, PRI 8 May 2020), CD79a (NP_001774.1, PRI 12 May 2020), CD79b (NP_000617.1, PRI 10 May 2020), Fc gamma RIIa (NP_001129691.1, PRI 14 Jun. 2020), DAP10 (NP_055081.1, PRI 9 May 2020), DAP12 (NP_003323.1, PRI 12 May 2020). In one embodiment, the human intracellular signal transduction domain is the intracellular region of CD3ζ protein.

The self-cleaving peptide within the above-mentioned CAR can be any type of common self-cleaving peptides, including E2A, F2A, P2A, T2A, etc. The self-cleaving peptide is a small "self-cleaving" peptide derived from virus, and its average length can be 18-22 amino acids. The mechanism of action of the self-cleaving peptide is as follows: during the translation process, a unique tertiary or quaternary structure will be formed, which will sterically hinder the catalytic center of the ribosomal peptidyl transferase, resulting in the interruption of the formation of peptide linkages. However, the ribosome keeps translating downstream mRNA, and "cut apart" the two peptides in cis by the way similar to proteolytic enzymes. The use of 2A elements in genetic engineering facilitates the tandem expression of two independent protein products. In one embodiment, the self-cleaving peptide thereof is a P2A peptide.

In the above-mentioned CAR, the human intracellular signaling domain includes an intracellular costimulatory signal domain and a signal transduction domain, wherein there are no restrictions on the order of these two. More specifically, the CAR comprises successively the scFv against tumor associated antigen, the transmembrane region, the intracellular costimulatory signal domain, the intracellular signal transduction domain, the self-cleaving peptide and the full-length human CD27, or the above-mentioned CAR comprises successively the scFv, the transmembrane region, the intracellular signal transduction domain, the intracellular costimulatory signal domain, the self-cleaving peptide and the full-length human CD27. In one embodiment, the CAR comprises successively the scFv, the transmembrane region, the intracellular costimulatory signal domain, the intracellular signal transduction domain, the self-cleaving peptide and the full-length human CD27.

In the above-mentioned CAR, a leading peptide is positioned before the scFv against tumor associated antigen. More specifically, the CAR comprises successively the leading peptide, the scFv, the transmembrane region, the intracellular costimulatory signal domain, the intracellular signal transduction domain, the self-cleaving peptide and the full-length human CD27, wherein the leading peptide can be any type of signal peptides, for example, signal peptides of secreted proteins, or leukocyte differentiation antigens (CD molecules) on the cell surface. In one embodiment, the leading peptide mentioned is the human CD8 leading peptide.

In above-mentioned CAR, it also includes the EGFRt peptide. More specifically, the CAR comprises successively a leading peptide, the scFv against tumor associated cell surface antigen, the human transmembrane region, the human intracellular costimulatory signal domain, the human intracellular signal transduction domain, the self-cleaving peptide, the signal peptide, the EGFRt peptide, the self-cleaving peptide, and the full-length human CD27. Wherein the signal peptide can be any type of the signal peptides, for example, signal peptides of secreted proteins, or leukocyte differentiation antigens (CD molecules) on the cell surface. In one embodiment, the signal peptide mentioned is the CSF2Ra signal peptide.

In one embodiment, when the scFv against tumor associated antigen is S15 scFv, the CAR comprises successively the human CD8 leading peptide, S15 scFv, the human CD8 hinge transmembrane region, the human 4-1BB intracellular region, the human CD3ζ intracellular region, the P2A peptide, the CSF2Ra signal peptide, the EGFRt peptide, the P2A peptide, and the full-length human CD27.

In another embodiment, when the scFv against tumor associated antigen is BCMA scFv, the CAR comprises successively the human CD8 leading peptide, BCMA scFv, the human CD8 hinge transmembrane region, the human 4-1BB intracellular region, the human CD3ζ intracellular region, the P2A peptide, and the full-length of human CD27.

In another embodiment, when the scFv against tumor associated antigen is LILRB4, the CAR comprises successively human CD8 leading peptide, LILRB4 scFv, human CD8 hinge transmembrane region, the human 4-1BB intracellular region, the human CD3ζ intracellular region, the P2A peptide, and the full-length of human CD27.

The above-mentioned human CD8 leading peptide can be any one of the following from A1) or A2):
  A1) The peptide or protein with the amino acid sequence corresponding to the 1-21 a.a. of SEQ ID No. 2;
  A2) The peptide or protein that has the amino acid sequence shown in positions 1-21 a.a. of SEQ ID No. 2 after one or several amino acid residue substitutions and/or deletions and/or additions, and has the same function.

The above-mentioned S15 scFv can be any one of the following from B1) or B2):
  B1) The protein with the amino acid sequence corresponding to 22-269 a.a. of SEQ ID No. 2;
  B2) The protein that has the amino acid sequence after one or several amino acid residues within 22-269 a.a. of SEQ ID No. 2 is substituted and/or deleted and/or added, and has the same function.

The human CD8 hinge transmembrane region mentioned can be any one of the following from C1) or C2):
  C1) The protein with the amino acid sequence corresponding to 270-338 a.a. of SEQ ID No. 2;
  C2) The protein that has the amino acid sequence after one or several amino acid residues within 270-338 a.a. of SEQ ID No. 2 is substituted and/or deleted and/or added, and has the same function.

The human 4-1BB intracellular region mentioned can be any one of the following from D1) or D2):
  D1) The protein with the amino acid sequence corresponding to 339-385 a.a. of SEQ ID No. 2;
  D2) The protein that has the amino acid sequence after one or several amino acid residues within 339-385 a.a. of SEQ ID No. 2 is substituted and/or deleted and/or added, and has the same function.

The human CD3ζ intracellular region mentioned can be any one of the following from E1) or E2):
  E1) The protein with the amino acid sequence corresponding to 386-497 a.a. of SEQ ID No. 2;
  E2) The proteins that has the amino acid sequence after one or several amino acid residues within 386-497 a.a. of SEQ ID No. 2 is substituted and/or deleted and/or added, and has the same function.

The P2A peptide mentioned can be any one of the following from F1) or F2):
  F1) The peptide or protein with the amino acid sequence corresponding to 498-523 a.a. or 881-906 a.a. of SEQ ID No. 2;
  F2) The peptide or protein that has the amino acid sequence after one or several amino acid residues within 498-523 a.a. or 881-906 a.a. of SEQ ID No. 2 is substituted and/or deleted and/or added, and has the same function.

The CSF2Ra signal peptide mentioned can be any one of the following from G1) or G2):
  G1) The peptide or protein with the amino acid sequence corresponding to 524-545 a.a. of SEQ ID No. 2;
  G2) The peptide or protein that has the amino acid sequence after one or several amino acid residues within 524-545 a.a. of SEQ ID No. 2 is substituted and/or deleted and/or added, and has the same function.

The EGFRt peptide mentioned can be any one of the following from H1) or H2):
  H1) The protein with the amino acid sequence corresponding to 546-880 a.a. of SEQ ID No. 2;
  H2) The protein that has the amino acid sequence after one or several amino acid residues within 546-880 a.a. of SEQ ID No. 2 is substituted and/or deleted and/or added, and has the same function.

The full-length of human CD27 mentioned can be any one of the following from I1) or I2):
  I1) The protein with the amino acid sequence corresponding to 907-1167 a.a. of SEQ ID No. 2;
  I2) The proteins that has the amino acid sequence after one or several amino acid residues within 907-1167 a.a. of SEQ ID No. 2 is substituted and/or deleted and/or added, and has the same function.

The BCMA scFv can be any one of the following from J1) or J2):
  J1) The protein with the amino acid sequence corresponding to 22-264 a.a. of SEQ ID No. 2;
  J2) The proteins that has the amino acid sequence after one or several amino acid residues within 22-264 a.a. of SEQ ID No. 2 is substituted and/or deleted and/or added, and has the same function.

In one embodiment, when the scFv is S15 scFv, the CAR mentioned can be any one of the following from (1) to (4):
  (1) The protein comprises the amino acid sequence of SEQ ID No. 2 or a sequence with 95-99% or 95%, 96%, 97%, 98% or 99% identify to SEQ ID No. 2;
  (2) The recombinant proteins with a tag attached to the N-terminal or/and C-terminal of the protein shown in SEQ ID No. 2;
  (3) The proteins that has the amino acid sequence after one or several amino acid residues shown in SEQ ID No. 2 is substituted and/or deleted and/or added, and has the same function.
  (4) The protein that has homology of over 99%, over 95%, over 90%, over 85%, or over 80% homology with any protein defined in either (1)-(3), and has the same function;

In another embodiment, when the scFv is BCMA scFv, the CAR mentioned can be any one of the following from (5)-(8):
  (5) The protein comprises the amino acid sequence of SEQ ID No. 6 or a sequence with 95-99% or 95%, 96%, 97%, 98% or 99% identify to SEQ ID No. 6;
  (6) The recombinant proteins obtained with a tag attached to the N-terminal or/and C-terminal of the protein shown in SEQ ID No. 6;
  (7) The proteins that has the amino acid sequence after one or several amino acid residues shown in SEQ ID No. 6 is substituted and/or deleted and/or added, and has the same function.
  (8) The protein that has homology of over 99%, over 95%, over 90%, over 85%, or over 80% with any protein mentioned in either (5) to (7), and has the same function.

In another embodiment, when the scFv is LILRB4 scFv, the CAR mentioned can be any one of the following from (9)-(12):
(9) The protein comprises the amino acid sequence of SEQ ID No. 9 or a sequence with 95-99% or 95%, 96%, 97%, 98% or 99% identify to SEQ ID No. 9;
(10) The recombinant proteins obtained with a tag attached to the N-terminal or/and C-terminal of the protein shown in SEQ ID No. 9;
(11) The proteins that has the amino acid sequence after one or several amino acid residues shown in SEQ ID No. 8 is substituted and/or deleted and/or added, and has the same function.
(12) The protein that has homology of over 99%, over 95%, over 90%, over 85%, or over 80% with any protein mentioned in either (9) to (11), and has the same function.

In any one of the proteins mentioned above, the type of tags are shown in Table 1.

TABLE 1

| Sequence of Tags | | |
|---|---|---|
| Tag | Residue | Sequence |
| Poly-Arg | 5-6 (usually 5) | RRRRR |
| Poly-His | 2-10 (usually 6) | HREIHHH |
| FLAG | 8 | DYKDDDDK |
| Strep-tag II | 8 | WSHPQFEK |
| c-myc | 10 | EQKLISEEDL |

The above-mentioned substitution and/or deletion and/or addition of one or several amino acid residues is a substitution and/or deletion and/or addition of no more than 10 amino acid residues.

Any of the proteins mentioned can be synthesized artificially, or the coding gene can be synthesized first, and then obtained by biological engineering.

To achieve the above purposes, this disclosure provides biological materials related to the CAR.

The biological materials associated with the CAR thereof can be any one of the following from 1) to 8):
1) A nucleic acid molecule encoding the above-mentioned CAR;
2) An expression cassette comprising the nucleic acid molecule described in 1);
3) A recombinant vector comprising the nucleic acid molecule described in 1);
4) A recombinant vector comprising the expression cassette described in 2);
5) A cell line comprising the nucleic acid molecule described in 1);
6) A cell line comprising the expression cassette described in 2);
7) A cell line comprising the recombinant vector described in 3);
8) A cell line comprising the recombinant vector described in 4).

In 1), the nucleic acid molecule encoding the above-mentioned CAR comprises successively the coding gene sequence of the scFv against tumor associated antigen, the human transmembrane region, the human intracellular signal domain, and the self-cleaving peptide, and the full-length human CD27. The coding gene sequence of the human intracellular signal domain includes the coding sequence of the intracellular costimulatory signal domain and the intracellular signal transduction domain.

The full-length human CD27 coding sequence suitable for this invention is a full-length human CD27 gene cDNA that has been genetically optimized. It should be noted that gene optimization is also called codon optimization, which means that to improve the expression level and efficiency without changing the amino acid sequence of the protein by replacing one or more nucleotides in the nucleic acid sequence encoding this protein. Gene optimization can be either achieved by various methods such as codon preference optimization, RNA advanced structure optimization, restriction site optimization, and GC content adjustment, etc. The assemble of full-length human CD27 coding sequences, which were all obtained by the above-mentioned gene optimization methods, are called oCD27. The common feature of these sequences is the use of optimized nucleotide codons, whereas they encode the identical amino acid sequence that is encoded by the wild-type human CD27 gene. NCBI's BLAST and BLASTp can be used to calculate the sequence identity between two aligned DNA sequences or amino acid sequences. In one embodiment, the coding sequence of oCD27 corresponds to 2719-3501 nt. of SEQ ID No. 1 or 1555-2337 nt. of SEQ ID NO: 5.

Preferably, when the scFv is S15 scFv, the nucleic acid molecule encoding the CAR thereof comprises successively the encoding sequence of the human CD8 leading peptide, the encoding sequence of the S15 scFv, the encoding sequence of the human CD8 hinge transmembrane region, the encoding sequence of the human 4-1BB intracellular region, the encoding sequence of the human CD3ζ intracellular region, the encoding sequence of the P2A peptide, the encoding sequence of CSF2Ra signal peptide, the encoding sequence of the EGFRt peptide, the encoding sequence of the P2A peptide, and the encoding sequence of the full-length human CD27.

In another embodiment, when the scFv against tumor associated antigen is BCMA scFv, the nucleic acid molecule encoding the CAR thereof comprises successively the encoding sequence of the human CD8 leading peptide, the encoding sequence of the BCMA scFv, the encoding sequence of the human CD8 hinge transmembrane region, the encoding sequence of the human 4-1BB intracellular region, the encoding sequence of the human CD3ζ intracellular region, the encoding sequence of the P2A peptide, and the encoding sequence of the full-length human CD27.

In another embodiment, when the scFv against tumor associated antigen is LILRB4 scFv, the nucleic acid molecule encoding the CAR thereof comprises successively the encoding sequence of the human CD8 leading peptide, the encoding sequence of the LILRB4 scFv, the encoding sequence of the human CD8 hinge transmembrane region, the encoding sequence of the human 4-1BB intracellular region, the encoding sequence of the human CD3ζ intracellular region, the encoding sequence of the P2A peptide, and the encoding sequence of the full-length human CD27.

The coding gene of human CD8 leading peptide mentioned can be any one of the following genes from a1) to a3):
a1) DNA molecules with sequence corresponding to 1-63 nt. of SEQ ID No. 1;
a2) DNA molecules with sequence which have 75% or over 75% homology with the nucleotide sequence defined by a1), and encode the above-mentioned human CD8 leading peptide;

a3) DNA molecules that hybridize with the nucleotide sequence defined by a1) or a2) under strict conditions and encode the above-mentioned human CD8 leading peptide.

The coding gene of S15 scFv mentioned can be any one of the genes from the following b1)-b3):
  b1) DNA molecules with sequence corresponding to 64-807 nt. of SEQ ID No. 1;
  b2) DNA molecules with sequence which have 75% or over 75% homology with the nucleotide sequence defined by b1), and encode the above-mentioned S15 scFv;
  b3) DNA molecules that hybridize with the nucleotide sequence defined by b1) or b2) under strict conditions and encode the above-mentioned S15 scFv.

The coding gene of the human CD8 hinge transmembrane region mentioned can be any one of the genes from the following c1)-c3):
  c1) DNA molecules with sequence corresponding to 808-1014 nt. of SEQ ID No. 1;
  c2) DNA molecules with sequence which have 75% or over 75% homology with the nucleotide sequence defined by c1), and encode the above-mentioned human CD8 hinge transmembrane region;
  c3) DNA molecules that hybridize with the nucleotide sequence defined by c1) or c2) under strict conditions and encode the above-mentioned human CD8 hinge transmembrane region.

The coding gene of the human 4-1BB intracellular region mentioned can be any one of the genes from the following d1)-d3):
  d1) DNA molecules with sequence corresponding to 1015-1155 nt. of SEQ ID No. 1;
  d2) DNA molecules with sequence which have 75% or over 75% homology with the nucleotide sequence defined by d1), and encode the above-mentioned human 4-1BB intracellular region;
  d3) DNA molecules that hybridize with the nucleotide sequence defined by d1) or d2) under strict conditions and encode the above-mentioned human 4-1BB intracellular region.

The coding gene of the human CD3ζ intracellular region mentioned can be any one of the genes from the following e1)-e3):
  e1) DNA molecules with sequence corresponding to 1156-1491 nt. of SEQ ID No. 1;
  e2) DNA molecules with sequence which have 75% or over 75% homology with the nucleotide sequence defined by e1), and encode the above-mentioned human CD3ζ intracellular region;
  e3) DNA molecules that hybridize with the nucleotide sequence defined by e1) or e2) under strict conditions and encode the above-mentioned human CD3ζ intracellular region.

The coding gene of the P2A peptide mentioned can be any one of the genes from the following f1)-f3):
  f1) DNA molecules with sequence corresponding to 1492-1569 nt. or 2641-2718 nt. of SEQ ID No. 1;
  f2) DNA molecules with sequence which have 75% or over 75% homology with the nucleotide sequence defined by f1), and encode the above-mentioned P2A peptide;
  f3) DNA molecules that hybridize with the nucleotide sequence defined by f1) or f2) under strict conditions and encode the above-mentioned P2A peptide.

The coding gene of the CSF2Ra signal peptide mentioned can be any one of the genes from the following g1)-g3):
  g1) DNA molecules with sequence corresponding to 1570-1635 nt. of SEQ ID No. 1;
  g2) DNA molecules with sequence which have 75% or over 75% homology with the nucleotide sequence defined by g1), and encode the above-mentioned CSF2Ra signal peptide;
  g3) DNA molecules that hybridize with the nucleotide sequence defined by g1) or g2) under strict conditions and encode the above-mentioned CSF2Ra signal peptide.

The coding gene of the EGFRt peptide mentioned can be any one of the genes from the following h1)-h3):
  h1) DNA molecules with sequence corresponding to 1636-2640 nt. of SEQ ID No. 1;
  h2) DNA molecules with sequence which have 75% or over 75% homology with the nucleotide sequence defined by h1), and encode the above-mentioned EGFRt peptide;
  h3) DNA molecules that hybridize with the nucleotide sequence defined by h1) or h2) under strict conditions and encode the above-mentioned EGFRt peptide.

The coding gene of the full-length human CD27 mentioned can be any one of the genes from the following i1)-i3):
  i1) DNA molecules with sequence corresponding to 2719-3501 nt. of SEQ ID No. 1;
  i2) DNA molecules with sequence which have 75% or over 75% homology with the nucleotide sequence defined by i1), and encode the above-mentioned full-length human CD27;
  i3) DNA molecules that hybridize with the nucleotide sequence defined by i1) or i2) under strict conditions and encode the above-mentioned full-length human CD27.

The coding gene of the BCMA scFv mentioned can be any one of the genes from the following j1)-j3):
  j1) DNA molecules with sequence corresponding to 64-792 nt. of SEQ ID No. 5;
  j2) DNA molecules with sequence which have 75% or over 75% homology with the nucleotide sequence defined by j1), and encode the above-mentioned BCMA scFv;
  j3) DNA molecules that hybridize with the nucleotide sequence defined by j1) or j2) under strict conditions and encode the above-mentioned BCMA scFv.

In one embodiment, when the scFv is S15 scFv, the nucleic acid molecule encoding the CAR thereof can be any one of the following genes from I) to III):
  I) DNA molecules comprising the sequence of SEQ ID No. 1 or a sequence having 80%-99%, 95%, 96%, 97%, 98% or 99% to SEQ ID No. 1;
  II) DNA molecules with sequence which have 75% or over 75% homology with the nucleotide sequence defined by I), and encode the above-mentioned CAR;
  III) DNA molecules that hybridize with the nucleotide sequence defined by I) or II) under strict conditions and encode the above-mentioned CAR.

In another embodiment, when the scFv is BCMA scFv, the nucleic acid molecule encoding the CAR thereof can be any one of the following genes from IV) to VI):
  IV) DNA molecules comprising the sequence of SEQ ID No. 5 or a sequence having 80%-99%, 95%, 96%, 97%, 98% or 99% to SEQ ID No. 5;
  V) DNA molecules with sequence which have 75% or over 75% homology with the nucleotide sequence defined by IV), and encode the above-mentioned CAR;

VI) DNA molecules that hybridize with the nucleotide sequence defined by IV) or V) under strict conditions and encode the above-mentioned CAR.

In another embodiment, when the scFv is LILRB4 scFv, the nucleic acid molecule encoding the CAR thereof can be any one of the following genes from IV) to VI):

IV) DNA molecules comprising the sequence of SEQ ID No. 8 or a sequence having 80%-99%, 95%, 96%, 97%, 98% or 99% to SEQ ID No. 8;

V) DNA molecules with sequence which have 75% or over 75% homology with the nucleotide sequence defined by IV), and encode the above-mentioned CAR;

VI) DNA molecules that hybridize with the nucleotide sequence defined by IV) or

V) under strict conditions and encode the above-mentioned CAR.

The coding sequence of the human CD8 leading peptide, S15 scFv, BCMA scFv, human Cd8 hinge transmembrane region, human 4-1BB intracellular region, human CD3ζ intracellular region, P2A peptide, CSF2Ra signal peptide, EGFRt peptide, the full-length of human CD27, or the CAR can be artificially mutated by known techniques, such as directed evolution or point mutation, etc. The above-mentioned artificially modified sequence, which have 75% or higher homology with the sequences encoding the human CD8 leading peptide, S15 scFv, BCMA scFv, human Cd8 hinge transmembrane region, human 4-1BB intracellular region, human CD3ζ intracellular region, P2A peptide, CSF2Ra signal peptide, EGFRt peptide, the full-length of human CD27, or the CAR, will all be considered as the nucleic acid sequences derived from this disclosure, as long as their functions did not change by these modifications. These derivations are equivalent to the nucleic acid sequences in this disclosure.

The term "homology" thereof refers to the similarity between natural nucleic acid molecules and their derivations. "Homology" includes the nucleic acid sequence derivations with sequence that has 75% or higher, 80% or higher, 85% or higher, 90% or higher, or 95% or higher homology with the parental nucleic acid molecule encoding the above-mentioned human CD8 leading peptide, S15 scFv, BCMA scFv, human Cd8 hinge transmembrane region, human 4-1BB intracellular region, human CD3ζ intracellular region, P2A peptide, CSF2Ra signal peptide, full-length of human CD27, or the CAR. The homology can be evaluated by bioinformational alignment analysis. By using computer software, the homology between two or more sequences can be displayed in the form of Homologous percentage (%), which can be used to evaluate the homology between relevant sequences.

The strict conditions thereof refers to: hybridization in a mixed solution of 7% sodium dodecyl sulfate (SDS), 0.5M NaPO$_4$, and 1 mM EDTA at 50° C., and wash in 2×SSC, 0.1% SDS at 50° C.

In above said 2), the expression cassette hereof consists of successively the promoter, the nucleic acid molecule encoding the CAR, and the terminator.

In above said 3) or 4), the vector hereof can be a viral vector. Preferably, the viral vector can be a retroviral vector or a lentiviral vector. More specifically, the retroviral vector is MP71. The recombinant vector expressing the CAR thereof is obtained by inserting the CAR gene into the viral vector.

In 5), 6), 7), or 8), the cell line hereof refers to the cell line for virus packaging or for virus culture, or T cells for virus infection. The cell line for virus packaging hereof specifically refers to Phoenix Ecotropic (ECO) cells; the cell line used for virus culture specifically refers to PG13 cells; and the T cells used for virus infection specifically refers to CD3$^+$ T cells.

To achieve the above purposes, this disclosure also provides a method for preparing CAR-T cells.

The method of preparing CAR-T cells hereof comprises of the following step: transducing the encoding genes of the CAR into T cells to express for obtaining CAR-T cells.

Optionally, the encoding genes of the CAR is transduced into T cells through a lentiviral expression system or a retroviral expression system.

More specifically, the method of transducing the encoding genes of the above-mentioned CAR into T cells to express is the Method (1) or Method (2) below:

The Method (1) includes the following steps: transfection of a CAR-expressing retrovirus into T cells; the retrovirus is prepared by transducing a recombinant retroviral vector into a retroviral packaging cell and collecting the supernatant of cell culture; the recombinant retroviral vector is obtained by inserting the encoding genes of the CAR into a retroviral empty vector;

Method (2) includes the following steps: transfection of a CAR-expressing lentivirus into T cells; the lentivirus is prepared by transducing a recombinant lentiviral vector into a lentiviral packaging cell and collecting the lysate of cultured cells; the lentiviral vector is obtained by inserting the encoding genes of the CAR into a lentiviral vector.

The above-mentioned Method (1), after transducing a recombinant retroviral vector into a retroviral packaging cell, also includes the following steps: The virus liquid in the cell culture supernatant is collected, and the virus liquid is transfected into subcultured cells, and clones are screened and cultured to obtain the toxin-producing cell strain with the highest virus titer. The virus in the culture supernatant of the toxin-producing cell strain with the highest virus titer is the retrovirus in the above method (1).

In one embodiment, the coding gene of the CAR thereof is transduced into T cells using a retrovirus expression system, wherein the retroviral vector is MP71. The recombinant retroviral vector was obtained by inserting the encoding genes of the CAR between restriction site of the NotI and EcoRI on the MP71, while keeping the other sequence on the vector unchanged. The above-mentioned retroviral packaging cell line is Phoenix Ecotropic (ECO). The above-mentioned passage cell line is PG13.

The CAR-T cells comprising the above mentioned chimeric antigen receptor or comprising the isolated nucleic acid molecule encoding the above mentioned chimeric antigen receptor are also claimed as protection scope of the present disclosure.

The isolated nucleic acid molecule encoding the above mentioned chimeric antigen receptor are also claimed as protection scope of the present disclosure.

The CAR-T cells prepared by the above method or the retrovirus or recombinant retroviral vector or lentivirus or recombinant lentiviral vector mentioned in the above method are also claimed as protection scope of the present disclosure.

The applications of the above-mentioned CAR, or the relevant biological materials, or the retrovirus or recombinant retroviral vector, or the lentivirus or recombinant lentiviral vector in the production or preparation of CAR-T cells are also claimed as protection scope of the present disclosure.

For the above-mentioned CAR, biological material, CAR-T cell, retrovirus, recombinant retrovirus vector, lentivirus, or the recombinant lentiviral vector, their applications in the following D1) to D4) conditions are also claimed as protection scope of the present disclosure:
D1) preparing the products for treating or supporting the treatment of cancer;
D2) treating or supporting the treatment of cancer;
D3) preparing the products to eliminating cancer cells;
D4) eliminating cancer cells;

To achieve the above purpose, this disclosure also provides a product for treating, or supporting the treatment of cancer, or eliminating the cancer cells.

The active component of the above-mentioned product includes the CAR, the biological material, the CAR-T, the retrovirus, the retroviral vector, the lentivirus, or the recombinant lentiviral vector thereof.

To achieve the above purposes, this disclosure also provides a method for treating or supporting the treatment of cancer.

The above-mentioned method includes the following steps: administering the above-mentioned CAR-T cells into the subject to treating or supporting the treatment of cancer.

In any of the above-mentioned application, or product, or method thereof, the cancer refer to solid carcinomas or hematological malignancies.

The solid carcinomas refer to Siglec-15 positive solid carcinomas, including glioma, melanoma, bladder cancer, liver cancer, lung cancer, kidney cancer, rectal cancer, endometrial cancer and thyroid cancer, etc. In one embodiment, the solid carcinoma is glioma, and the cancer cells are human glioma cells (such as U87-MG).

The hematological malignancies are BCMA-positive hematological malignancies (such as multiple myeloma) or LILRB4-positive hematological malignancies (such as acute monocytic leukemia). In one embodiment, the hematological malignancy is multiple myeloma, and the cancer cells are human multiple myeloma cells (such as RPMI8226). In another embodiment, the hematological malignancy is human AML cells (such as THP-1).

Furthermore, the subject hereof refers to human and non-human animals. The non-human animals hereof refer to all vertebrates, such as mammals and non-mammals.

DRAWINGS AND ILLUSTRATIONS THERE OF

Figure 8:
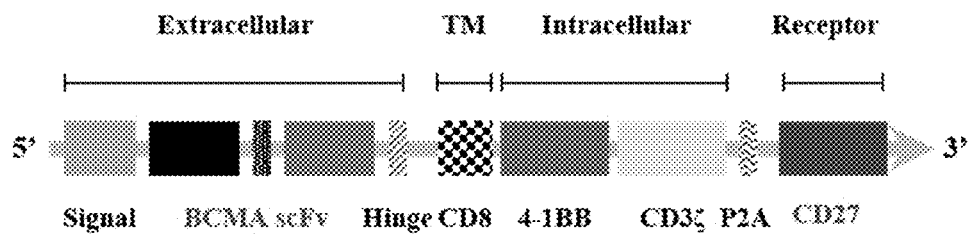

FIG. 8 is the schematic diagram of the structure of BCMA-CAR-CD27. ScFv: single chain antibody fragment; Hinge: CD8 hinge region; TM: CD8 transmembrane region.

Figure 9:
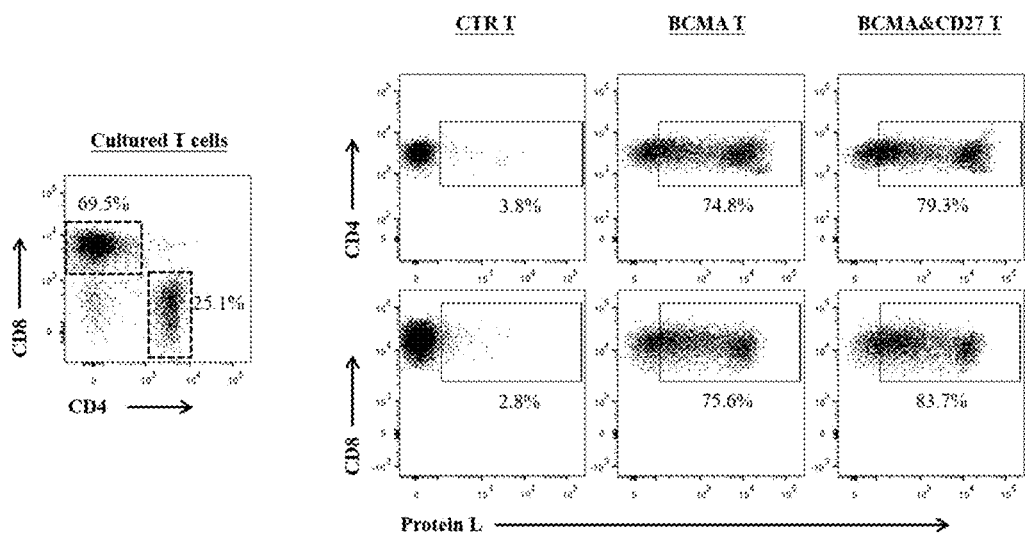

FIG. 9 is the flow cytometry analysis showing the rate of Protein L (CAR) positive CD4$^+$ or CD8$^+$ CAR-T cells at 3 days after retrovirus transfection of T cells.

Figure 10:
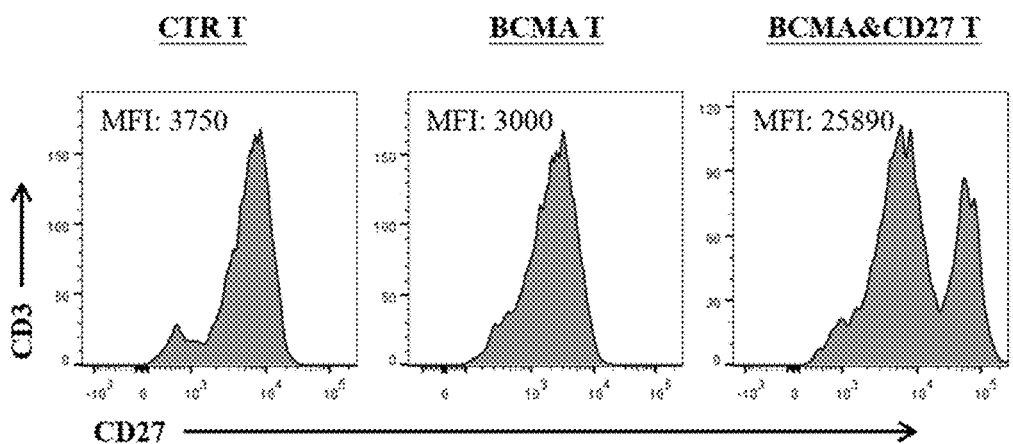

FIG. 10 is the flow cytometry analysis showing the expression level of CD27 on BCMA-CAR-CD27 T, CTR T or BCMA-CAR T cells after retrovirus transfection. MFI: mean fluorescence intensity.

FIG. 11 shows the CFSE labeling analysis of the lysis rate of target cells after co-culture with CAR-T cells at various E:T ratios.

FIGS. 12A-12C shows the results of D-luciferin sodium salt imaging after the tail vein injection of CAR-T cells in a tumor xenograft model to observe the residual tumor cells in mice. FIG. 12A refers to the general experimental procedure; FIG. 12B is the statistics of the fluorescein intensity in each group of mice at different time points; FIG. 12C is the sodium salt imaging result of each group of mice.

FIG. 13 is the schematic diagram of the structure of LILRB4-CAR-CD27. ScFv: single chain antibody fragment; Hinge: CD8 hinge region; TM: CD8 transmembrane region.

Figure 14:
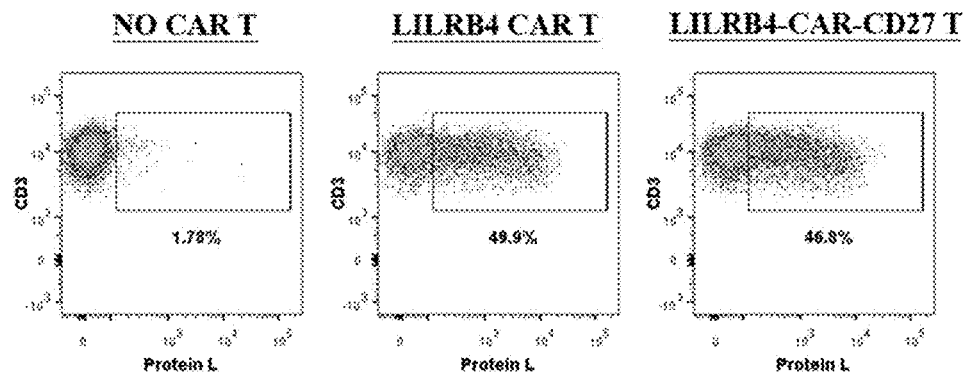

FIG. 14 is the flow cytometry analysis showing the rate of Protein L (CAR) positive CD4$^+$ or CD8$^+$ CAR-T cells at 3 days after retrovirus transfection of T cells.

Figure 15:
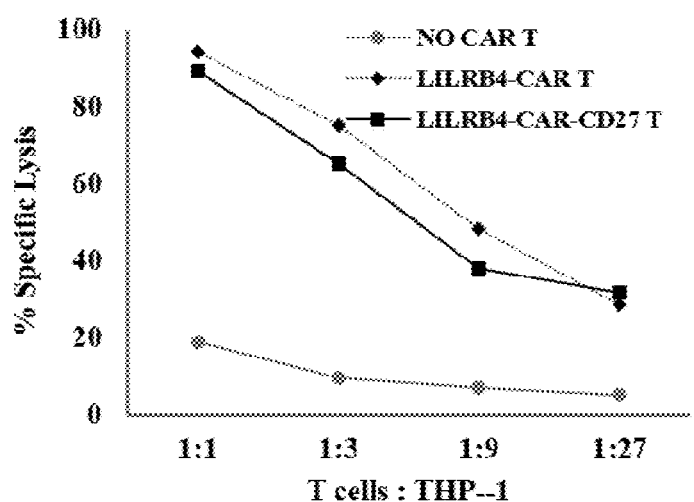

FIG. 15 shows the CFSE labeling analysis of the lysis rate of target cells after co-culture with CAR-T cells at various E:T ratios.

Figure 16A:
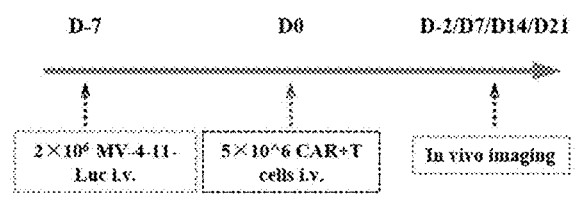
Figure 16B:
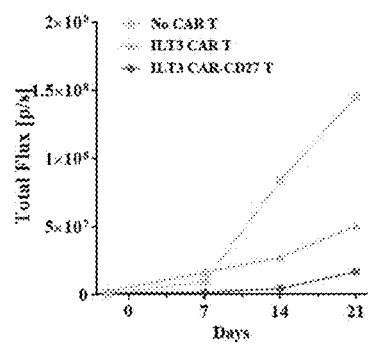
Figure 16C:
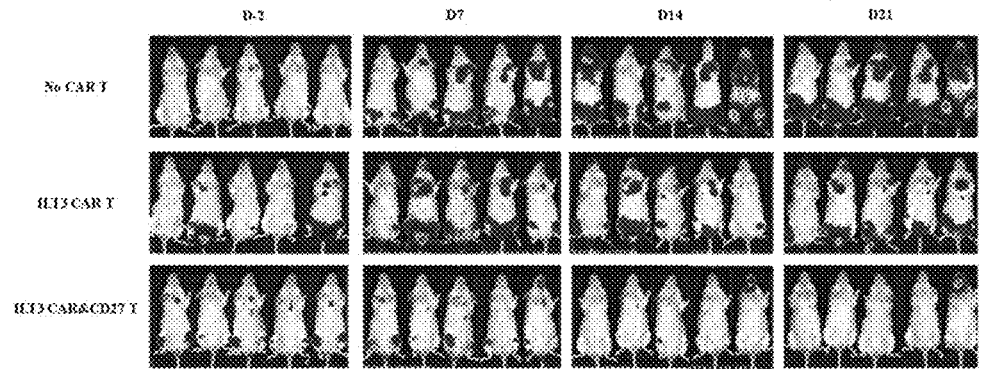

FIGS. 16A-16C shows the results of D-luciferin sodium salt imaging after the tail vein injection of CAR-T cells in a tumor xenograft model to observe the residual tumor cells in mice. FIG. 16A refers to the general experimental procedure; FIG. 16B is the statistics of the fluorescein intensity in each group of mice at different time points; FIG. 16C is the sodium salt imaging result of each group of mice.

EMBODIMENTS

Unless otherwise specified, the experimental methods presented in the following embodiments are all routine methods.

Unless otherwise specified, the materials, reagents and so on can all be obtained from commercial sources.

The detail information of the retroviral vector (MP71) in the following embodiments is documented in"Engels, B., et al., Retroviral vectors for high-level transgene expression in T lymphocytes. Hum Gene Ther, 2003. 14(12): p 0.1155-68.". It can be obtained by public from Carbiogene Therapeutics Co., Ltd.

Embodiment 1. Preparation of CAR-T Cells Modified by S15-CAR-CD27 Gene

Stage I. Construction of Retroviral Vectors
1. Optimization of the Full-Length cDNA Sequence of Wild-Type Human CD27 Gene The full-length cDNA sequence of the wild-type human CD27 gene is called nature CD27 (nCD27). To make nCD27 more suitable for expression in human cells, the nCD27 sequence was codon-optimized on the website http://sg.idtdna.com/site while remaining the amino acid sequence encoded by nCD27 unchanged, to obtain optimized CD27 (oCD27). The nucleotide sequence of oCD27 is shown at 2719-3501 nt. of SEQ ID NO. 1.

2. Design and Synthesis of DNA Expressing CAR Gene

The gene sequence of S15-CAR-CD27 comprises the encoding gene sequence of the following: human CD8 leading peptide, S15 scFv, human CD8 hinge transmembrane region, the human 4-1BB intracellular region, the human CD3ζ intracellular region, the P2A peptide (recorded as P2A peptide-1), the CSF2Ra signal peptide, the EGFRt peptide, the P2A peptide (recorded as P2A peptide-2), and oCD27. The integrated gene sequence of S15-CAR-CD27 is shown in SEQ ID NO. 1, wherein the encoding gene sequence of the human CD8 leading peptide corresponds to 1-63 nt. of SEQ ID NO. 1, the encoding gene sequence of the S15 scFv corresponds to 64-807 nt. of SEQ ID NO. 1, the encoding gene sequence of the human CD8 hinge transmembrane region corresponds to 808-1014 nt. of SEQ ID NO. 1, the encoding gene sequence of the human 4-1BB intracellular region corresponds to 1015-1155 nt. of SEQ ID NO. 1, the encoding gene sequence of the human CD3ζ intracellular region corresponds to 1156-1491 nt. of SEQ ID NO. 1, the encoding gene sequence of the P2A peptide-1 corresponds to 1492-1569 nt. of SEQ ID NO. 1, the encoding gene sequence of the CSF2Ra signal peptide corresponds to 1570-1635 nt. of SEQ ID NO. 1, the encoding gene sequence of the EGFRt peptide corresponds to 1636-2640 nt. of SEQ ID NO. 1, the encoding gene sequence of the P2A peptide-2 corresponds to 2641-2718 nt. of SEQ ID NO. 1, and the encoding gene sequence of the oCD27 corresponds to 2719-3501 nt. of SEQ ID NO. 1. The amino acid sequence encoded by the S15-CAR-CD27 gene is shown in SEQ ID NO. 2.

The gene sequence of S15-CAR successively comprises: the encoding gene sequence of the following: human CD8 leading peptide, S15 scFv, the human CD8 hinge transmembrane region, the human 4-1BB intracellular region, the human CD3ζ intracellular region, the P2A peptide, the CSF2Ra signal peptide, and the EGFRt peptide. The gene sequence of S15-CAR is shown in SEQ ID NO. 3, wherein the encoding gene sequence of the human CD8 leading peptide corresponds to 1-63 nt. of SEQ ID NO. 3, the encoding gene sequence of the S15 scFv corresponds to 64-807 nt. of SEQ ID NO. 3, the encoding gene sequence of the human CD8 hinge transmembrane region corresponds to 808-1014 nt. of SEQ ID NO. 3, the encoding gene sequence of the human 4-1BB intracellular region corresponds to 1015-1155 nt. of SEQ ID NO. 3, the encoding gene sequence of the human CD3ζ intracellular region corresponds to 1156-1491 nt. of SEQ ID NO. 3, the encoding gene sequence of the P2A peptide corresponds to 1492-1569 nt. of SEQ ID NO. 3, the encoding gene sequence of the CSF2Ra signal peptide corresponds to 1590-1635 nt. of SEQ ID NO. 3, and the encoding gene sequence of the EGFRt peptide corresponds to 1636-2643 nt. of SEQ ID NO. 3.

Figure 1:
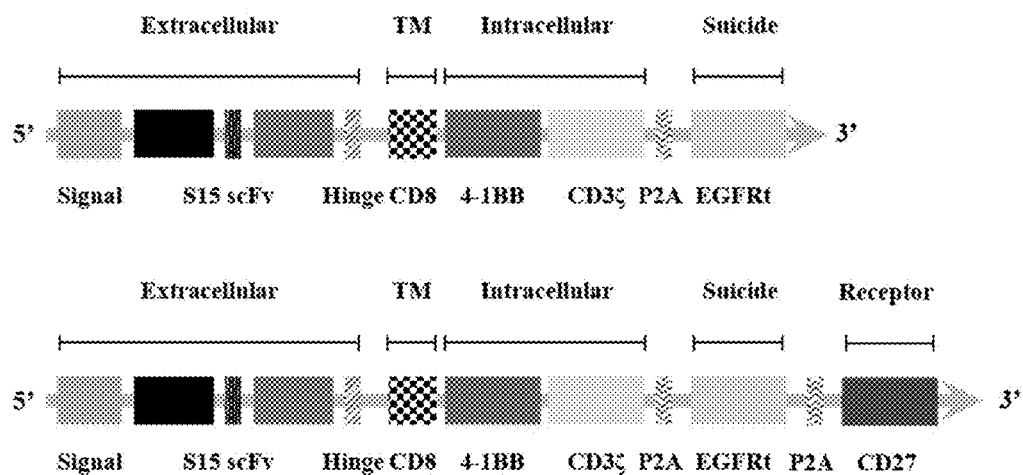
FIG. 1 is the schematic diagram of CAR structure. The upper panel shows the gene structure of S15-CAR, and the lower panel shows the gene structure of S15-CAR-CD27.

The schematic diagrams of the structure of the main elements of the S15-CAR-CD27 gene and the S15-CAR gene are shown in FIG. 1.

The full-length DNA expressing S15-CAR-CD27 or S15-CAR can be synthesized by TSINGKE Biotechnology Co., Ltd. The synthesized gene sequence is cloned into pUC57 vector before sequencing and identification.

3. Construction of Retroviral Vector

The recombinant retroviral vector expressing S15-CAR-CD27 can be constructed by inserting the DNA sequence of the S15-CAR-CD27 shown in SEQ ID NO. 1 between the NotI and EcoRI site of the retroviral vector (MP71).

The recombinant retroviral vector expressing S15-CAR can be constructed by inserting the DNA sequence of the S15-CAR shown in SEQ ID NO. 3 between the NotI and EcoRI site of the retroviral vector (MP71).

The control retroviral vector can be made by inserting the gene sequence of the non-S15-targeting CAR shown in SEQ ID NO. 4 between the NotI and EcoRI site of the retroviral vector (MP71), and keep the other sequences of the retroviral vector (MP71) unchanged.

Stage II. Retrovirus Packaging and Establishment of the Stable Strain for Retrovirus Production The recombinant retroviral vectors S15-CAR-CD27 and S15-CAR and the control retroviral vector prepared in Stage I were packaged separately to obtain two retroviruses and the control retrovirus according to the following methods:

Step 1. Culture of Packaging Cells

In each 10 cm cell culture dish, deposit $6\times10^6$ Phoenix Ecotropic (ECO) cells (ATCC, CRL-3214) (less than 20 generations, but not overgrown) and 10 ml of DMEM medium, mix the cells thoroughly, and incubate overnight at 37° C.

Step 2. Transfection of Packaging Cells

Conduct transfection when the confluence of ECO cells reaches about 50-60%. Add 12.5 μg of target plasmid, 250 μl of 1.25M $CaCl_2$, 1 ml $ddH_2O$, with the total volume of 1.25 ml in one tube; add an equal volume of 2×HBS solution to another tube, add the plasmid complex to the 2×HBS solution, vortex and shake for 20 s while adding the plasmid complex to obtain a mixture. Gently add the mixture to the ECO cell culture dish along the side; incubate cells at 37° C. for 6 hours, and replace the medium with pre-warmed fresh complete medium.

Step 3. Collecting the Crude Retrovirus

At 48 hours after transfection, collect the supernatant of culture and filter through a 0.45 μm filter to obtain the virus stock, which can be stored in aliquots at −80° C.

The virus stock obtained from the recombinant retroviral vector S15-CAR-CD27 is referred to as S15-CAR-CD27 retrovirus. The virus stock obtained from the recombinant retroviral vector S15-CAR is referred to as the S15-CAR retrovirus. The virus stock obtained from the control retroviral vector was referred to as the control retrovirus.

Step 4. Establishment of the Stable Strain for Retrovirus Production

Transfect PG13 cells (ATCC, CRL-10686) with the virus stock obtained in step 3. At two days after the transfection, the CAR-positive cells were enriched by EGFR antibody (Biolegend) and MACS Anti-APC/PE Micro beads (Miltenyi, 130-090-855). The ratio of CAR-positive cells can be measured by flow cytometry. Dilute the enriched CAR-positive cells into single cells and seed them into a 96-well plate. Collect the supernatant on the 5th day after seeding as the crude retrovirus. The virus titer can be determined through flow cytometry by further transfecting HT1080 cells with these crude retrovirus. Select top three strains with highest virus titer in the 96-well plate and transfer them into a 24-well plate for further expansion and a secondary clonal selection. Collect the supernatant on the 5th day after seeding as the crude retrovirus to transfect HT1080 cells, determine virus titer by flow cytometry. The clone with the highest titer was selected as the stable strain for retrovirus production, and stored in liquid nitrogen. By using such cell strain, crude retrovirus can be prepared on a large scale for gene transduction to prepare CAR-T cells.

Stage III. Preparation of CAR-T Cells

1. Thaw an aliquot of the frozen peripheral blood mononuclear cells (PBMC) from healthy donors and adjust the cell density to $(1-2)\times10^6$ cells/ml with RPMI-1640 complete medium containing 10% FBS.

2. Use Ficoll-Paque reagent (GE health) and magnetic beads (Miltenyi) to enrich $CD3^+$ T cells from PBMC, and use clinical-grade Dynabeads Human T Expander CD3/CD28 magnetic beads (Invitrogen) at a ratio of 3:1 for magnetic beads: CD3+ cell volume ratio to activate T cells.

3. On the second day after T cell activation, coat a 6-well plate with Retronectin solution (Takara) at a concentration of 15 μg/ml and seed CD3+ T cells into these coated plates. Add 1.2 ml Retronectin solution to each well of plate, keep the plate at 4° C. overnight and avoid light exposure for further use.

4. At two days after T cell activation, aspirate the coating solution in the 6-well plate, and wash the plate with PBS once.

5. Transfection: add the virus stock prepared in step 2 (the culture supernatant of the stable strain with the highest virus titer) into the wells (5-6 ml/well), centrifuge at 32° C., 2000×g for 2 h, discard the supernatant (unbound virus), and add 3 ml of fresh RPMI-1640 complete medium containing hIL-2 (Shanghai Huaxin Biotech Co., Ltd.) (500 U/ml) to each well, with the initial cell density at about $2 \times 10^6$ cells/ml.

6. After transfection, culture cells at 37° C. and add fresh RPMI-1640 complete medium containing hIL-2 (100 U/ml) to avoid overcrowded of T cells in the wells. The cell density should be maintained at $5 \times 10^5$ cells/ml to facilitate cell expansion.

Collect T cells at 72 hours after transfection with the virus stock and obtain transfected CAR-T cells. The T cells transfected with the S15-CAR-CD27 retrovirus are referred to as S15 CAR-CD27 T cells. The T cells transfected with the S15-CAR retrovirus are referred to as S15 CAR T cells.

According to above procedures, NO CAR T cells or CTR CAR T cells can be obtained by replacing the virus stock with an equal volume of PBS solution or control retrovirus.

Figure 2:
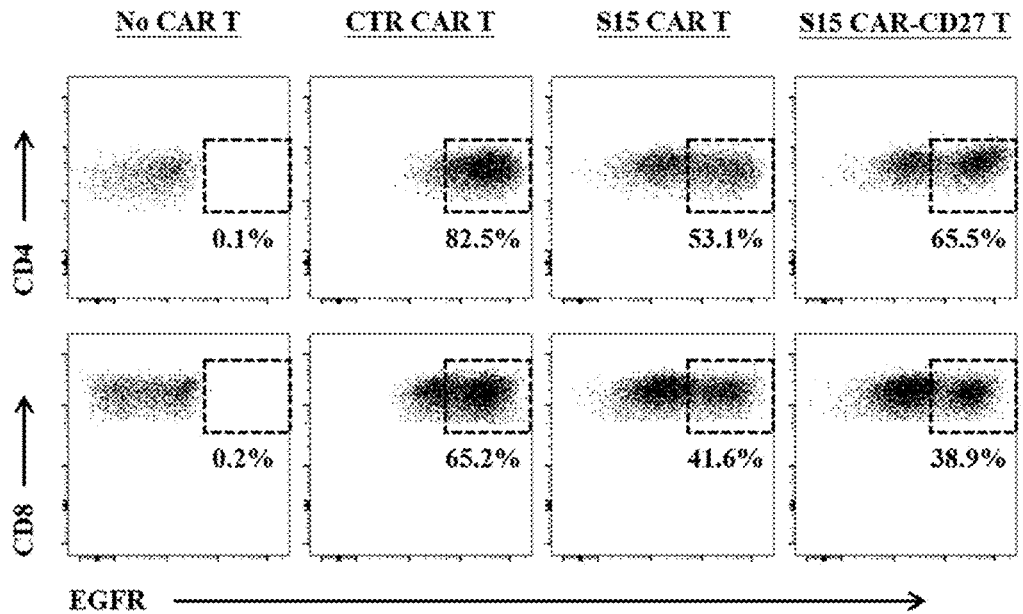
FIG. 2 shows the flow cytometry analysis of the positive rate of EGFR (CAR) on the CD4$^+$ or CD8$^+$ CAR-T cells at 3 days after retrovirus transfection of T cells.

Stage IV. Determination of the Proportion of CAR-T Cells and the Expression Level of CAR Gene by Flow Cytometry Since the CAR Gene Contains the EGFRt Fragment, the Expression Level of the CAR gene can be reflected by the expression level of EGFRt. With the S15 CAR-CD27 T cells, S15 CART cells, CTR CAR T cells or No CAR T cells obtained in step 3 as the test cells, the expression level of EGFRt can be determined by FACS method through EGFR antibodies. The procedures are described as follows: centrifuge cells in an EP tube and wash them with FACS buffer (2% (volume fraction) FBS-containing PBS solution), discard the supernatant, resuspend the pellets and add FITC-labeled EGFR antibody (Biolegend). Incubate cells at room temperature and keep away from light for 30 minutes. Wash with FACS buffer again, suspend to obtain resuspended cells. Detect the fluorescence intensity of FITC of resuspended cells by flow cytometry Results: As shown in FIG. 2. At 3 days after using the retrovirus prepared in step 2 to transfect T cells, the positive rate of EGFR (CAR) in CD4+ T cells was between 50% and 80%, and the positive rate of EGFR (CAR) in CD8+ T cells was between 30%-70%.

Stage V. Determination of the Functional Indexes of CAR-T Cells by Flow Cytometry 1. Determination of the Level of IFNγ Expression IFNγ is an important indicator reflecting the function of T cells. The higher the expression of IFNγ, the higher the activity of T cells. The expression level of IFNγ in S15 CAR-CD27 T cells, S15 CAR T cells, or CTR CAR T cells obtained in step 3 was detected by intracellular cytokine staining method. Detail procedures are described as follows:

S15 CAR-CD27 T cells, S15 CAR T cells or CTR CAR T cells were co-cultured with human glioma cell U87-MG (ATCC) at a cell number ratio of 1:1, respectively ($2 \times 10^5$/ well U87-MG), use Golgi Plug reagent (BD bioscience) to inhibit protein transport, and collect cell in 6 hours. The collected cells are performed surface staining first, and then intracellular staining and analyzed by flow cytometry.

Figure 3:
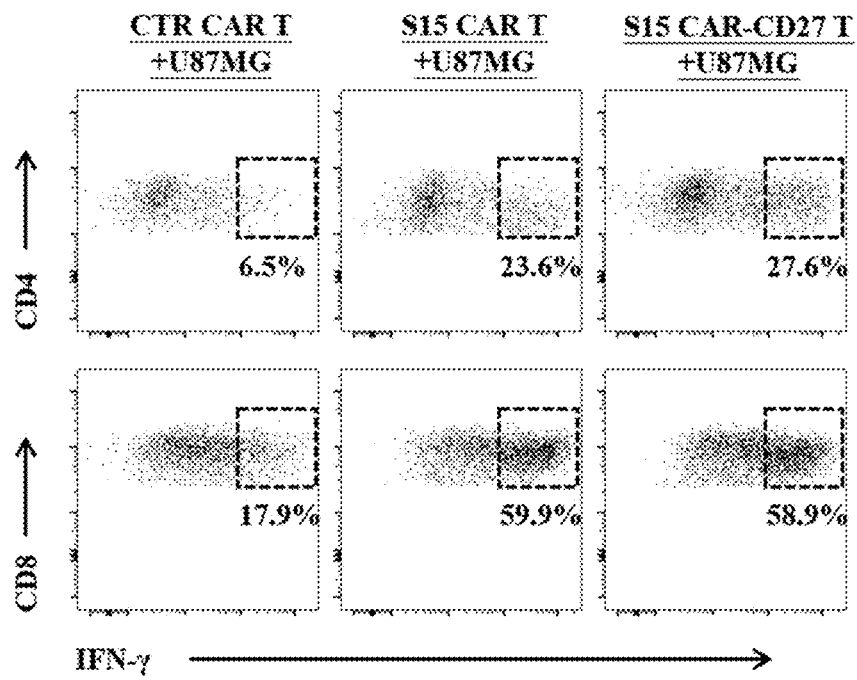
FIG. 3 is the flow cytometry analysis of the positive rate of IFNγ in CD4$^+$ or CD8$^+$ CAR-T cells at 3 days after retrovirus transfection of T cells.

Results: As shown in FIG. 3, compared with that in CTR CAR T cells, the expression levels of IFNγ in S15 CAR T cells and S15 CAR-CD27 T cells were both significantly increased after co-cultured with U87-MG, respectively. The increase of IFNγ was especially high for the CD8+ T cell subgroup (cytotoxic T cells), the positive rate of IFNγ exceeds 50%.

2. Determination of the Level of CD107a Expression

Lysosome-associated membrane protein 1 (CD107a) is the main component of vesicle membrane protein. When activated T cells differentiate into cytotoxic T-lymphocytes (CTL cells), whose important feature is the high level of cytotoxic particles in the form of vesicles. In the process of CTL cells and NK cells killing target cells, the toxic particles will fuse with the cell membrane (the CD107a molecule will be transported to the cell membrane surface at this time), causing the particle content to be released, and ultimately leading to the death of the target cell. Therefore, the CD107a molecule is a sensitive marker of CTL degranulation, which is directly related to the cytotoxic activity. The expression level of CD107a is detected by flow cytometry to reflect the activity level of T cells. Detail procedures are described as follows:

S15 CAR-CD27 T cells, S15 CAR T cells or CTR CAR T cells were cocultured with human glioma cell U87-MG (ATCC) in DMEM medium at a cell number ratio of 1:1 ($2 \times 10^5$ U87-MG/per well). Add APC-labeled anti-CD107a antibody (Biolegend) to the co-culture system and incubate for 1 hour, and then add Golgi Stop reagent (BD), and incubate for another 3 hours before collecting the cells. The collected cells were subjected to surface staining and flow cytometry detection.

Figure 4:
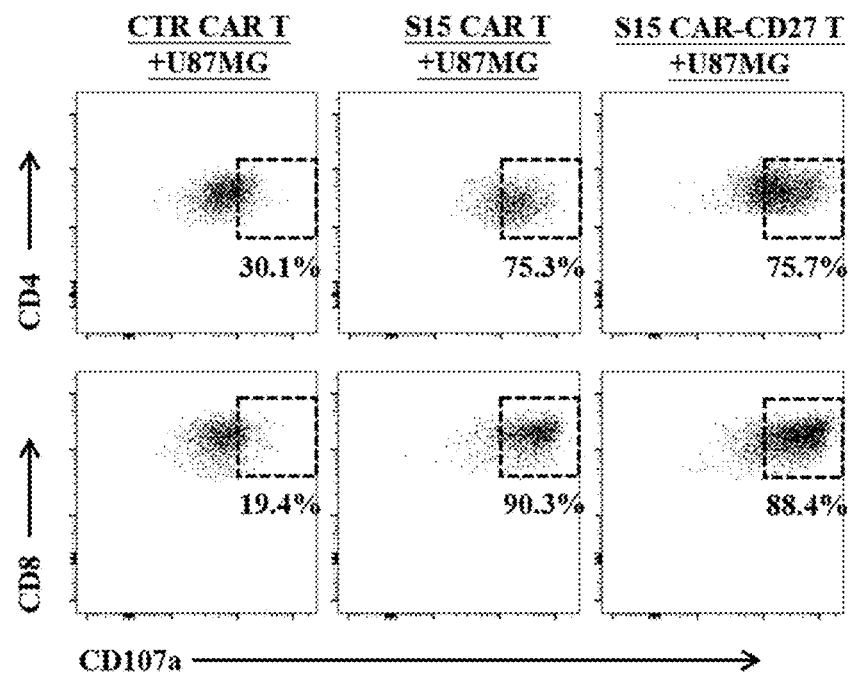
FIG. 4 is the flow cytometry analysis of the positive rate of CD107a in CAR-T cells of CD4$^+$ or CD8$^+$ CAR-T cells at 3 days after retrovirus transfection of T cells.

Results: As shown in FIG. 4, compared with that in CTR CAR T cells, the expression level of CD107a in S15 CART and S15 CAR-CD27 T cells had a significant increase after co-culture with target cells. The increase of CD107a was especially high for CD8+ T cell subgroup (cytotoxic T cells), the positive rate of CD107a reaches 80%-90%.

Stage VI. Determination of the Cytotoxic Effect of CAR-T Cells Genetically Modified by S15-CAR-CD27 on Tumor Cells by CFSE Labeling CFSE (CFDA-SE) is a fluorescent staining reagent that can label and visualize living cells. It can easily penetrate cell membranes and covalently bind to intracellular proteins in living cells, which will release green fluorescence after hydrolysis. The CFSE labeling method can be used to label and quantify tumor cells, so as to reflect the cytotoxic effect of CAR-T cells on target tumor cells. Detail procedures are described as follows: equally divide the target cells into two groups, adjust them to the same cell density. Stain the cells with low-concentration or high-concentration of CFSE respectively, in which high-concentration-CFSE-stained target cells and unstained immune cells were co-cultured in a certain proportion. After incubation for a period of time, mix the equal amount of the high-concentration-CFSE-stained target cell tube (along with immune cells) and the low-concentration-CFSE-stained target cell tube stained at a low concentration. Finally, by comparing the percentage of target cells in the CFSE low-concentration labeling group and the CFSE high-concentration labeling group, the lysis rate target cells by CAR T cells can be calculated. Detailed procedures are described as follows:

1. Trypsinize the U87-MG cells in the mid-log phase and neutralized with the complete medium. Pipet the cell suspension and transfer to a 15 ml centrifuge tube, wash cells twice with PBS.

2. Centrifuge at 300-500 g for 1-5 min, and discard the supernatant. Use PBS to resuspend the cells and adjust the cell density to $(1-2) \times 10^7$ cells/ml.

3. Divide the above U87-MG cell suspension into two equal parts, one part is marked as CFSE high-labeled cells, and another part is marked as CFSE low-labeled cells. Incubate CFSE low-labeled cells with low-concentration CFSE (Invitrogen, 0.5 μM), and CFSE high-labeled cells with high-concentration CFSE (5 μM). Detailed procedures are described as following: add CFSE dye (Invitrogen) at a predetermined concentration into the tubes, and incubate at 37° C. for 10 min in the dark.

4. Stop the staining by adding at least 2 times volume of cold complete medium, and centrifuge at 300-500 g for 5 min.

5. Remove the supernatant, collect the cell pellet, and wash cells twice with complete medium.

6. Deposit the above stained U87-MG cells into the 96 well plate, in CFSE high-labeled group (CFSE high-labeled cells+T cells): in each well inoculate U87-MG cells at the density of $5 \times 10^4$ cells/100 μl; then add different amounts of CAR-T cells (S15-CAR-CD27 T cells, S15-CAR T cells or CTR CART cells) in the so that the ratios of CAR-T cells to U87-MG cells are 1:1, 1:3, 1:9, 1:27 respectively; in the CFSE low-labeled group (cells just labeled by CFSE): inoculate U87-MG cells (5×104 cells/100 μl) in each well and culture individually, and supplement complete medium in the wells to the same volume with that in the CFSE high-labeled group. CFSE high-labeled cell wells that were not co-cultured with CAR-T cells are set as the control group.

7. After 6 hours of culture at 37° C., mix cells in the CFSE high-labeled group and CFSE low-labeled group at the ratio of 1:1, and record them as the experimental mix group. In the meantime, collect and mix cells in the control group and CFSE low-labeled group at the ratio of 1:1, and record them as the control mix group.

8. Detect the fluorescence value of each group using the FITC channel of flow cytometry (FIG. 2).

9. The lysis rate of target cells by T cells (%): two FITC positive peaks, which are CFSE high-labeled and low-labeled peaks respectively, should be detected by the flow cytometry. Measure the proportion of two peaks of the CFSE high-labeled group and the CFSE low-labeled group, respectively. Then, the lysis rate (%) of target cells by T cells should be calculated according to the following formula:

The lysis rate of target cells by T cells (%)=100%-[(percentage of CFSE high-labeled cells in the experimental mix group %/percentage of low-labeled CFSE cells in the experimental mix group %)/(percentage of CFSE high-labeled cells in the control mix group %)/(percentage of CFSE low-labeled cells in the control mix group %)]×100%.

For example, in mixed cells of the experimental group, the proportion of CFSE high-labeled cells was 42.5%, while the proportion of CFSE low-labeled cells was 57.5%; the proportion of CFSE high-labeled cells in mixed cells of the control group was 49.5%, and the proportion of CFSE low-labeled cells was 51.5%; therefore, the lysis rate of target cells by T cells (%)=100%−(42.5%/57.5%)/(49.5%/51.5%)×100%.

Figure 5:
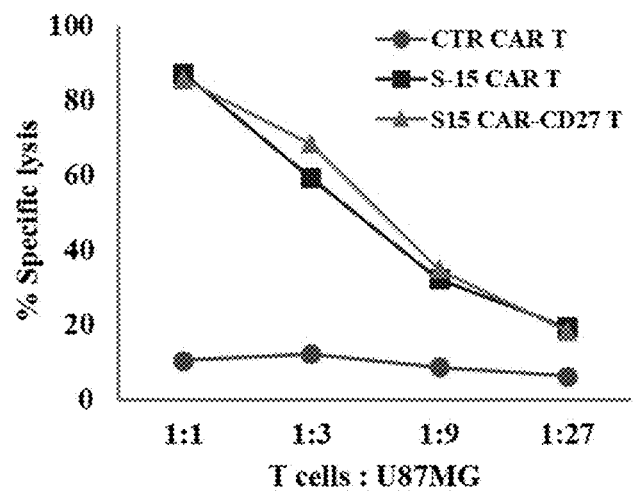
FIG. 5 shows the CFSE labeling analysis of the lysis rate of target cells after co-culture with CAR-T cells at various E:T ratios.

Results: as shown in FIG. 5 and Table 2, after co-culture with S15 CAR-CD27 T cells, the lysis rate of target cells U87-MG reached 80% at the E:T ratio of 1:1; the lysis rate remained on about 20% at the E:T ratio of 1:27.

TABLE 2

The lysis rate of target cells by CAR-T cells (%)

| | | S15 CAR-CD27 T Cells | S15 CAR T Cells | CTR CAR T Cells |
|---|---|---|---|---|
| E:T ratio | 1:1 | 85.63801027 | 87.20338913 | 10.47173548 |
| | 1:3 | 68.27473587 | 59.38989916 | 12.28141664 |
| | 1:9 | 34.73851586 | 32.26043245 | 8.727444664 |
| | 1:27 | 18.26043245 | 19.26043245 | 6.209480257 |

Stage VII. Determination of the Cytotoxic Effect of CAR-T Cells Genetically Modified by S15-CAR-CD27 Using a Tumor Xenograft Model In Vivo Experimental materials: B-NDG severe combined immunodeficiency (SCID) mice weighing 18-22 g of 5-6 weeks old (Biocytogen Biotech Co., Ltd.).

Experimental groups: The experimental mice are randomly divided into 3 groups with 5 mice in each group.

S15-CAR-CD27 T: Inject U87-MG cells (PBS as solvent) intravenously into the B-NDG mice through the tail vein, the injected amount is 0.3 mL (contain $2 \times 10^6$ tumor cells). Five days after inoculation, mice are injected with the S15-CAR-CD27 T cell (PBS as solvent) solution prepared in Embodiment 1 through the tail vein. The injected amount of S15 CAR-CD27 T cells is 0.2 ml (contain $5 \times 10^6$ S15 CAR-CD27 T cells).

S15 CAR T: Inject U87-MG cells (PBS as solvent) intravenously into the B-NDG mice through the tail vein, the injected amount is 0.3 mL (contain $2 \times 10^6$ tumor cells). Five days after inoculation, mice are injected with the S15 CAR T cell (PBS as solvent) solution prepared in Embodiment 1 through the tail vein. The injected amount of S15 CART cells is 0.2 ml (contain $5 \times 10^6$ S15 CAR T cells).

CTR CAR T: Inject U87-MG cells (PBS as solvent) intravenously into the B-NDG mice through the tail vein, the injected amount is 0.3 mL (contain $2 \times 10^6$ tumor cells). Five days after inoculation, mice are injected with the CTR CAR T cell (PBS as solvent) solution prepared in Embodiment 1 through the tail vein. The injected amount of CTR CART cells is 0.2 ml (contain $5 \times 10^6$ CTR CAR T) Experimental method: Within 42 days after the CAR-T cell injection, measure the tumor diameter of each mouse every three days. Count and plot the tumor diameter at each time point. Within 90 days after the CAR-T cell injection, check the number of surviving mice and draw the survival curve.

Figure 6:
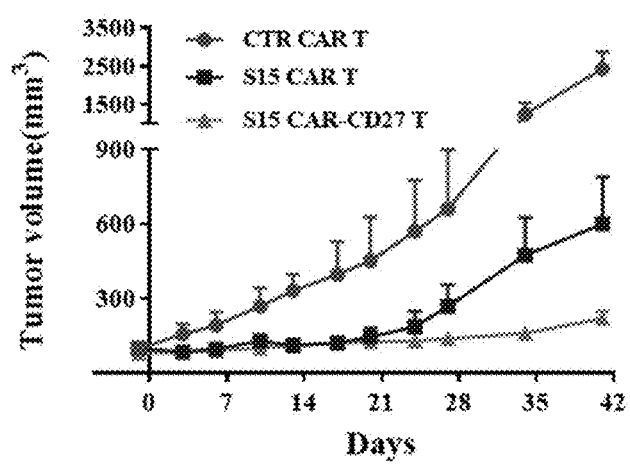
FIG. 6 shows the statistical results of tumor volume in mice.
Figure 7:
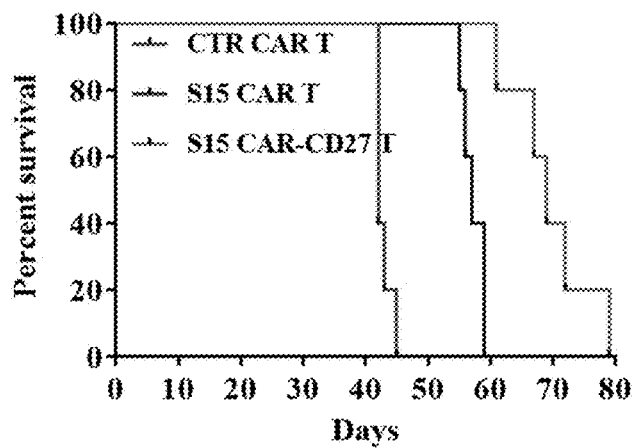
FIG. 7 shows the statistical results of survival rate of mice.

Results: as shown in FIG. 6 and FIG. 7, compared with the S15 CAR-T control group, the U87-MG cell residues in the S15 CAR-CD27 T group are significantly reduced. The results show that S15 CAR-CD27 T cells are more effective in killing U87-MG tumor cells.

Embodiment 2. Preparation of CAR-T Cells Genetically Modified by BCMA-CAR-CD27

I. Construction of Retroviral Vectors

1. Design and Synthesis BCMA-CAR-CD27 Gene

The gene sequence of BCMA-CAR-CD27 comprises the DNA encoding gene sequence of the following: the human CD8 leading peptide, BCMA scFv, the human CD8 hinge transmembrane region, the human 4-1BB intracellular region, the human CD3ζ intracellular region, the P2A peptide, and oCD27.

The integrated gene sequence of BCMA-CAR-CD27 is shown in SEQ ID NO. 5, wherein the encoding gene sequence of the human CD8 leading peptide corresponds to 1-63 nt. of SEQ ID NO. 5, the encoding gene sequence of BCMA scFv corresponds to 64-792 nt. of SEQ ID NO. 5, the encoding gene sequence of the human CD8 hinge transmembrane region corresponds to 793-999 nt. of SEQ ID NO. 5, the encoding gene sequence of the human 4-1BB intracellular region corresponds to 1000-1140 nt. of SEQ ID NO. 5, the encoding gene sequence of the human CD3ζ intracellular region corresponds to 1141-1476 nt. of SEQ ID NO. 5, the encoding gene sequence of the P2A peptide corresponds to 1477-1554 nt. of SEQ ID NO. 5, and the encoding gene sequence of oCD27 corresponds to 1555-2337 nt. of SEQ ID NO. 1. The amino acid sequence encoded by the BCMA-CAR-CD27 gene sequence is shown in SEQ ID NO. 6. The schematic diagram of the structure of the main elements of the BCMA-CAR-CD27 gene is shown in FIG. 8.

The gene sequence of BCMA-CAR shown in SEQ ID NO. 7 comprises the encoding gene sequence of the following: the human CD8 leading peptide, BCMA scFv, the human CD8 hinge transmembrane region, the human 4-1BB intracellular region, and the human CD3ζ intracellular region.

The full-length gene sequence expressing BCMA-CAR-CD27 or BCMA-CAR can be synthesized by TSINGKE Biotechnology Co., Ltd. The synthesized gene sequence is cloned into pUC57 vector for sequencing and identification.

2. Construction of Retroviral Vector

The recombinant retroviral vector BCMA-CAR-CD27 can be obtained by inserting the gene sequence of the BCMA-CAR-CD27 shown in SEQ ID NO. 5 between the NotI and EcoRI restriction site of the retroviral vector (MP71), and keeping other part of the retroviral vector (MP71) unchanged.

The recombinant retroviral vector BCMA-CAR can be obtained by inserting the gene sequence of the BCMA-CAR between the NotI and EcoRI restriction site of the retroviral vector (MP71) and keeping other part of the retroviral vector (MP71) unchanged. The full-length gene sequence of BCMA-CAR corresponds to 1-1476 nt. of SEQ ID No: 5.

The control retroviral vector in step I of Embodiment 1 is used as a non-BCMA-targeting control retroviral vector.

II. Retrovirus Packaging and Establishment of the Stable Strain for Retrovirus Production After the recombinant retroviral vectors or control vectors were constructed, recombinant retrovirus that express BCMA-CAR-CD27 or BCMA-CAR, or control retrovirus can be obtained respectively following procedures provided below:

Step 1. Culture of Packaging Cells

In each 10 cm cell culture dish, deposit $0.6 \times 10^6$ Phoenix Ecotropic (ECO) cells (ATCC, CRL-3214) (less than 20 generations, but not overgrown) and at the density of 10 ml of DMEM medium, mix the cells thoroughly, and incubate overnight at 37° C.

Step 2. Transfection of Packaging Cells

Transfection can be performed when the confluence of ECO cells reaches about 90%; Add 12.5 μg of target plasmid, 250 μl of 1.25M $CaCl_2$, 1 ml dd$H_2O$, with the total volume of 1.25 ml in one tube; add an equal volume of 2×HBS solution to another tube, add the plasmid complex to the 2×HBS solution, vortex and shake for 20 s while adding the plasmid complex to obtain a mixture and gently add the above-mentioned mixture into the ECO cell culture dish along the side; incubate cells at 37° C. for 6 hours, and replace the medium with pre-warmed fresh complete medium.

Step 3. Collecting the Crude Retrovirus

At 48 hours after transfection, collect the supernatant of culture and filter through a 0.45 μm filter to obtain the virus stock, which can be stored in aliquots at −80° C. The virus stock obtained from the recombinant retroviral vector BCMA-CAR-CD27 is referred to as BCMA-CAR-CD27 retrovirus. The virus stock obtained from the recombinant retroviral vector BCMA-CAR is referred to as the BCMA-CAR retrovirus.

Step 4. Establishment of the Stable Strain for Retrovirus Production

Transfect PG13 cells (ATCC, CRL-10686) with the virus stock obtained in step 3. At two days after the transfection, the CAR-positive cells were enriched by EGFR antibody (Biolegend) and MACS Anti-APC/PE Micro beads (Miltenyi, 130-090-855). The ratio of CAR-positive cells can be measured by flow cytometry. Dilute the enriched CAR-positive cells into single cells and seed them into a 96-well plate. Collect the supernatant on the 5th day after seeding as the crude retrovirus. The virus titer can be determined through flow cytometry by further transfecting HT1080 cells with these crude retrovirus. Select top three strains with highest virus titer in the 96-well plate and transfer them into a 24-well plate for further expansion and a secondary clonal selection. Collect the supernatant on the 5th day after seeding as the crude retrovirus to transfecting HT1080 cells, determine virus titer by flow cytometry. The clone with the highest titer was selected as the stable strain for retrovirus production and stored in liquid nitrogen. By using the cell strain, crude retrovirus can be prepared on a large scale for gene transduction to prepare CAR-T cells.

III. Preparation of CAR-T Cells

1. Thaw an aliquot of the frozen peripheral blood mononuclear cells (PBMC) from healthy donors and adjust the cell density to $(1-2) \times 10^6$ cells/ml with RPMI-1640 complete medium containing 10% FBS.

2. Use Ficoll-Paque reagent (GE health) and magnetic beads (Miltenyi) to enriched $CD3^+$ T cells from PBMC, and use clinical-grade Dynabeads Human T Expander CD3/CD28 magnetic beads (Invitrogen) at a ratio of 3:1 for magnetic beads: CD3+ cell volume ratio to activate T cells.

3. On the second day after T cell activation, coat a 6-well plate with Retronectin solution (Takara) at a concentration of 15 μg/ml and seed $CD3^+$ T cells into these coated plates. Add 1.2 ml Retronectin solution to each well of plate, keep the plate at 4° C. overnight and avoid light exposure for further use.

4. At two days after T cell activation, aspirate the coating solution in the 6-well plate, and wash the plate with PBS once.

5. Transfection: add the virus stock prepared in step II (the culture supernatant of the stable strain with the highest virus titer) into the wells (5-6 ml/well), centrifuge at 32° C., 2000×g for 2 h, discard the supernatant (unbound virus), and add 3 ml of fresh RPMI-1640 complete medium containing hIL-2 (Shanghai Huaxin Biotech Co., Ltd.) (500 U/ml) to each well, with the initial cell density at about $2 \times 10^6$ cells/ml, continue to culture for one day.

6. After transfection, culture cells at 37° C. and add fresh RPMI-1640 complete medium containing hIL-2 (100 U/ml) to avoid overcrowded of T cells in the wells. The cell density should be maintained at $5\times10^5$ cells/ml to facilitate cell expansion.

Collect T cells at 72 hours after transfection with the virus stock, obtaining the CAR-T cells transfected with retrovirus The T cells transfected with the BCMA-CAR-CD27 virus stock are referred to as S15 CAR-CD27 T cells. The T cells transfected with the BCMA-CAR virus stock are referred to as S15 CAR T cells.

According to above procedures, CTR T cells or Exb T cells can be obtained by replacing the virus stock with an equal volume of PBS solution or control retrovirus.

IV. Determination of the Proportion of CAR-T Cells and the Expression Level of CAR Gene by Flow Cytometry 1. The Proportion of CAR-Positive T Cells and the CAR Gene Expression Since the light chain of the anti-BCMA scFv is a κ subtype that can bind to Protein L, the expression level of the CAR gene can be reflected by the expression level of biotin-labeled Protein L(PL) bound to CAR-T cells. The procedures of detecting CAR gene expression are described as follows:

Centrifuge and Collect two kind of CAR-T cells and CAR-T cells (control) prepared in the Stage III at 72 h post transfection, and wash them with 1% BSA-containing PBS solution once, discard the supernatant, resuspend the pellets and add Biotin-labeled protein L antibody (Biolegend). Incubate cells at room temperature and keep away from light for 30 minutes. Wash again with 1% PBS solution with 1% BSA and resuspend. Then add PE-labeled avidin (Streptavidin) (Sigma). Incubate cells at room temperature and keep away from light for 10 minutes, Wash again with 1% PBS solution with 1% BSA and resuspend, detect the fluorescence intensity of PE by flow cytometry.

Results: as shown in FIG. 9, at 3 days after transfection by the retrovirus prepared in the step III the positive rate of PL (CAR) in both CD4+ T cells and CD8+ T cells reach 80%.

2. Determination of CD27 Expression Level

The expression level of CD27 was determined by flow cytometry. The procedures are described as follows: centrifuge and collect the CAR-T cells and CTR T cells prepared in step III after 72 hours of transfection, respectively.

Results: as shown in FIG. 10, the expression level of CD27 in BCMA CAR-CD27 T cells was significantly higher than that in CTR T and BCMA CAR T cells. The results indicate that CD27 can be highly express on the surface of CAR-T cells.

V. Detection of the Cytotoxic Effect of T Cells Genetically Modified by BCMA-CAR-CD27 on Tumor Cells by CFSE Labeling The procedure of CFSE labeling was similar to the methods described in Embodiment 2, effector cells are the BCMA-CAR-CD27 T cells, BCMA-CAR T cells, or CTR T cells prepared in embodiment 4, the target cells are human multiple myeloma cells RPMI8226, and keep other step unchanged to determine the cytotoxic effect of T cells genetically modified by BCMA-CAR-CD27 on tumor cells.

The results are shown in FIG. 11 and Table 3: after co-culture with BCMA CAR-CD27 T cells, the cell lysis rate of RMPI-8226 reached over 80% at E:T ratio of 3:1; when the E:T ratio was 1:3, the cell lysis rate of RMPI-8226 remained on about 20%.

TABLE 3

Cell Lysis Rate of target cells by CAR-T cells (%)

| | | BCMA-CAR-CD27 T Cells | BCMA-CAR T Cells | CTR T Cells |
|---|---|---|---|---|
| E:T ratio | 3:1 | 78.16955684 | 80.00963391 | 20.83044316 |
| | 1:3 | 50.47976879 | 57.70712909 | 15.1734104 |
| | 1:3 | 18.76685934 | 24.08477842 | 7.803468208 |

VI. Determination of the Cytotoxic Effect of T Cells Genetically Modified by BCMA-CAR-CD27 Using a Tumor Xenograft Model In Vivo Experimental materials: B-NDG SCID mice weighing 18-22 g of 5-6 weeks old (Biocytogen Biotech Co., Ltd.).

Experimental groups: The experimental materials are randomly divided into 4 groups with 6 mice in each group.

Experimental procedure: Inject Daudi-Luc cells (Shanghai Meixuan Biotechnology Co., Ltd., MXC193) (PBS as solvent) intravenously into the B-NDG mice through the tail vein, by inoculation amount 0.3 ml (contain $2\times10^6$ tumor cells). Five days after inoculation, mice are injected with the BCMA-CAR-CD27 T cell solution prepared in step III of this embodiment (PBS as solvent) through the tail vein. The inoculation amount of BCMA CAR-CD27 T cells is 0.2 ml (contain $5\times10^6$ CAR' T cells).

BCMA CAR T: Inject Daudi-Luc cells (PBS as solvent) intravenously into the B-NDG mice through the tail vein, the injected amount is 0.3 mL (contain $2\times10^6$ tumor cells). Five days after inoculation, mice are injected with the BCMA CAR T cell (PBS as solvent) solution prepared in Embodiment 2 through the tail vein. The injected amount of BCMA CAR T cells is 0.2 ml (contain $5\times10^6$ BCMA CAR T cells).

Exb T: Inject Daudi-Luc cells (PBS as solvent) intravenously into the B-NDG mice through the tail vein, the injected amount is 0.3 mL (contain $2\times10^6$ tumor cells). Five days after inoculation, mice are injected with the Exb T cell (PBS as solvent) solution prepared in Embodiment 2 through the tail vein. The injected amount of Exb T cells is 0.2 ml (contain $5\times10^6$ Exb T cells).

Experimental method: At 7 days, 14 days and 21 days after inoculation, intraperitoneally inject 3 mg of D-luciferin into each mice for sodium salt-base imaging and measure the number of residual tumor cells and the fluorescein intensity (photon density).

Results: as shown in FIGS. 12A-12C, compared that in mice of BCMA CAR T group, the number of residual human lymphoma cells in mice of BCMA CAR-CD27 T group are significantly reduced. The results indicated that BCMA CAR-CD27 T cells are more effective in killing tumors.

Embodiment 3 Preparation of CAR-T Cells Modified by LILRB4-CAR-CD27 Gene

I. Construction of Retroviral Vectors

The DNA sequence of LILRB4-CAR-CD27 comprises the DNA sequence of the following: human CD8 leading peptide, LILRB4 scFv, human CD8 hinge transmembrane region, the human 4-1BB intracellular region, the human CD3ζ intracellular region, the P2A peptide, and oCD27. The integrated DNA sequence of LILRB4-CAR-CD27 is shown in SEQ ID NO. 8, wherein the human CD8 leading peptide corresponds to 1-63 nt. of SEQ ID NO. 8, LILRB4 scFv corresponds to 64-807 nt. of SEQ ID NO. 8, the human CD8 hinge transmembrane region corresponds to 808-1014 nt. of SEQ ID NO. 8, the human 4-1BB intracellular region corresponds to 1015-1155 nt. of SEQ ID NO. 8, the human CD3ζ intracellular region corresponds to 1156-1491 nt. of SEQ ID NO. 8, the P2A peptide corresponds to 1492-1569 nt. of SEQ ID NO. 8, and oCD27 corresponds to 1570-2349 nt. of SEQ ID NO. 8. The amino acid sequence encoded by the LILRB4-CAR-CD27 gene is shown in SEQ ID NO. 9.

The DNA sequence of LILRB4-CAR comprises the DNA sequence of the following: human CD8 leading peptide, S15 scFv, the human CD8 hinge transmembrane region, the human 4-1BB intracellular region, the human CD3ζ intracellular region. The DNA sequence of LILRB4-CAR corresponds to 1-1494 nt. of SEQ ID NO. 10.

The schematic diagrams of the structure of the main elements of the LILRB4-CAR-CD27 gene and the LILRB4-CAR gene are shown in FIG. 13.

The full-length DNA expressing LILRB4-CAR-CD27 or LILRB4-CAR can be synthesized by TSINGKE Biotechnology Co., Ltd. The synthesized DNA is cloned into pUC57 vector before sequencing and identification.

The recombinant retroviral vector expressing LILRB4-CAR-CD27 or LILRB4-CAR can be constructed by inserting the DNA sequence of the CAR into the retroviral vector (MP71).

II. Retrovirus Packaging and Establishment of the Stable Strain for Retrovirus Production After the recombinant retroviral vectors or control vectors were obtained, recombinant retrovirus expressing LILRB4-CAR-CD27 or LILRB4-CAR, or control retrovirus can be collected respectively by the procedures provided in step II of Embodiment 1.

III. Preparation of CAR-T Cells

After the recombinant retrovirus or control retrovirus were obtained, T cells expressing LILRB4-CAR-CD27, or LILRB4-CAR, or CTR CAR were prepared by following the procedures provided in step III of Embodiment I.

NO CAR T cells can be obtained by replacing the virus stock thereof with an equal volume of PBS solution, and by following the above procedures.

IV. Determination of the Expression Level of CAR Gene on Transfected T Cells by Flow Cytometry The detection of biotin-labeled protein L (PL) is used to reflect the expression of CAR gene. The procedures of detecting PL by flow cytometry are described in step IV of Embodiment 2.

Results: as shown in FIG. 14, at 3 days after transfection, the positive rates of PL (CAR) in CD3+ T cells are between 40-50%.

V. Detection of the Cytotoxic Effect of LILRB4-CAR-CD27 T Cells on Tumor Cells by CFSE Labeling The procedure of CFSE labeling was similar as described in the step VI of Embodiment 1, except for difference of the target cells and effector CAR-T cells. In this embodiment, effector cells are the LILRB4-CAR-CD27 T cells, LILRB4-CAR T cells, or NO CAR T cells prepared in the step III of these embodiment. The target cells are human AML cells THP-1.

The results are shown in FIG. 15 and Table 4: after co-culture with LILRB4-CAR-CD27 T cells or LILRB4-CAR T cells, the cell lysis rate of THP-1 reached nearly 90% at E:T ratio of 1:1; when the E:T ratio was 1:27, the cell lysis rate of THP-1 remained about 30%.

TABLE 4

Cell Lysis Rate of target cells by CAR-T cells (%)

|  |  | LILRB4-CAR-CD27 T | LILRB4-CAR T | NO CAR T |
|---|---|---|---|---|
| E:T ratio | 1:1 | 89.16201 | 94.16537 | 18.86584 |
|  | 1:3 | 64.94319 | 74.93448 | 9.30364 |
|  | 1:9 | 37.89472 | 48.16738 | 6.82762 |
|  | 1:27 | 31.52405 | 28.37413 | 5.02689 |

VI. Determination of the Cytotoxic Effect of LILRB4-CAR-CD27 T Cells Using a Tumor Xenograft Model In Vivo Experimental materials: B-NDG SCID mice weighing 18-22 g of 5-6 weeks old (Biocytogen Biotech Co., Ltd.); human AML cell line transfected with Luciferase MV-4-11-Luc (Labcorp).

Experimental groups: The experimental materials are randomly divided into 3 groups with 5 mice in each group.

Experimental procedure: Inject MV-4-11-Luc cells (PBS as solvent) intravenously into the B-NDG mice through the tail vein, at the concentration of $2\times10^6$ cells/0.3 ml. Five days after inoculation, mice are injected with $5\times10^6$/0.2 ml LILRB4-CAR-CD27 T or LILRB4 CAR T or NO CAR T cell solution prepared in step III of this embodiment (PBS as solvent) through the tail vein. The concentration of T cells for inoculation is $5\times10^6$ CAR' T cells/0.2 ml.

At 7 days, 14 days and 21 days after inoculation, intraperitoneally inject 3 mg of D-luciferin sodium salt into each mice and measure the number of residual tumor cells by quantifying the fluorescein intensity (photon density).

Results: as shown in FIGS. 16A-16C, compared that in mice of LILRB4-CAR T group, the number of residual human AML cells in mice of LILRB4-CAR-CD27 T group are significantly reduced. The results indicated that LILRB4-CAR-CD27 T cells are more effective in killing tumors.

INDUSTRIAL APPLICATIONS

This disclosure provided a new CAR design that use CD27 as the costimulatory signal for the first time, which make the CD27 signaling pathway can be activated independent of the CAR signaling in an uncoupled manner. Based on our current knowledge, the intracellular domain, but not the full-length of CD28, 4-1BB or OX40, are usually used as the costimulatory signaling domain of the CAR gene.

The main reason for using the intracellular domain instead of the full-length of the costimulatory receptor is that the length of CAR gene is limited for viral packaging; on the other hand, the simultaneous activation of the costimulatory signal and the ITAM signal through a tandam expression pattern was shown to be beneficial for full activation of T cells.

However, subsequent studies have shown that constitutive activation of one costimulatory signal, such as CD28, is more likely to cause T cell exhaustion, which will be devastating for CAR-T cell therapy. As a matter of fact, the type and the time point of co-stimulatory signal received by T cells determine whether T cells can be fully activated.

For example, CD27 and CD28 are both highly expressed in primitive T cells, while their expression are downregulated in terminally differentiated T cells, indicating that both of these signals play important functions in the early stages of T cell response. On the contrary, other co-stimulatory receptors, such as CD137 and CD134, are highly expressed in activated T cells, and they play an important role in resisting T cell exhaustion caused by apoptosis. Activating any one of these costimulatory signals constitutively cannot replace the functions of the others.

Based on the above hypothesis, some studies tandemly connect two or more intracellular signal domains of costimulatory receptors, which is the design principle of the third generation of CAR. However, recent studies show that the anti-tumor effect of the third-generation CAR-T cells is not good enough compared with that of the second-generation CAR-T cells, possibly because the tandem expression of multiple costimulatory signal domains may conflict with each other, thus inhibit effective transmission of the signals.

Based on much preliminary studies, the inventors of this invention found that by activating the CD27 signal of CAR-T cells, the differentiation of T cells into effector T cells and memory T cells after antigen stimulation can be significantly promoted, which is vital for the long-term survival and secondary response of CAR-T cells in vivo.

Thus the inventors uncoupled the two costimulatory signals, so that they can be activated separately in the presence of antigens.

More specifically, a gene-optimized human full-length CD27 gene fragment (oCD27) is added at the C-terminal of the CAR, and separate it with P2A peptide; oCD27 is designed to co-express with the CAR gene comprising a 4-1BB costimulatory domain; these two products will be cleaved by the P2A self-cleaving peptide released from the ribosome; the released CD27 is transported to the cell surface, where it can be activated by CD70 and other ligands. The main feature of this design is to achieve uncoupled activation of the two costimulatory signal pathways of 4-1BB and CD27.

Apart from anti-BCMA and anti-Siglec-15 scFv, other anti-TAA scFv can also be applied in preparing the CAR-T cells provided in this disclosure. These CAR-T cells therefore target the corresponding TAAs and can be applied in treating different types of solid carcinomas or hematological malignancies.

The invention claimed is:

1. A method of treatment or adjuvant treatment of a Siglec-15-positive tumor comprising administering to the subject in need of such treatment an effective amount of CAR (chimeric antigen receptor)-T cells comprising
an isolated nucleic acid molecule encoding a chimeric antigen receptor successively comprising:
a single chain antibody fragment (scFv) against the tumor associated antigen Siglec-15,
a human CD8 transmembrane region,
a human intracellular signaling domain,
a P2A self-cleaving peptide and
a full-length CD27, wherein, the human intracellular signaling domain includes an intracellular costimulatory signal domain of human 4-1BB and a signal transduction domain of human CD3ζ;
the amino acid sequence of the chimeric antigen receptor is shown in SEQ ID NO. 2;
the Siglec-15-positive tumor is a human glioma tumor; and
the treatment reduces tumor volume.

2. The method of claim 1, wherein the tumor consists of a solid tumor.

* * * * *

SEQUENCE LISTING

```
<160> NUMBER OF SEQ ID NOS: 10

<210> SEQ ID NO 1
<211> LENGTH: 3501
<212> TYPE: DNA
<213> ORGANISM: Artificial Sequence
<220> FEATURE:
<223> OTHER INFORMATION: Synthesized

<400> SEQUENCE: 1
atggctctgc ctgtgaccgc cctgctgctg cctctggctc tgctgctgca cgccgctcgg      60
cctgacattg tgctgaccca gagccccgcc ctggctgtga gcctgggaca gagagccacc     120
atcagctgca gagcctccca gagcgtgacc atcagcggat acagctttat ccactggtat     180
cagcagaagc ccggccagca gcctagactg ctgatctaca gagctagcaa cctggcctcc     240
ggcatccccg ccagattctc aggaagcggc agcggcaccg actttaccct gactatcaac     300
cccgtgcagg ctgacgacat cgccacctac ttctgccagc agtcccgcaa aagcccctgg     360
accttcgccg gcggcaccaa actggagctg agaagaaccg gcggcggggg ttctggtggc     420
ggcggcagcg gcggtggagg atcagaggtg cagattctgg agaccggagg cggactggtg     480
aagccaggag gaagcctgag actgagctgt gccacaagcg gattcaactt taatgattac     540
tttatgaact gggtgaggca ggctcccgag aagggcctgg agtgggtggc ccagattaga     600
aacaagatct acacctacgc caccttctat gccgagagcc tggagggcag agtgaccatc     660
agcagagatg atagcgagtc aagcgtgtac ctgcaggtga gcagcctgag agccgaagac     720
accgccatct actactgcac caggagcctg accgaggcg actacttcga ttactgggga     780
cagggggtga tggtgaccgt gagtagcact acaactccag cacccagacc ccctacacct     840
gctccaacta tcgcaagtca gcccctgtca ctgcgccctg aagcctgtcg ccctgctgcc     900
gggggagctg tgcatactcg gggactggac tttgcctgtg atatctacat ctgggcgccc     960
ttggccggga cttgtgggt ccttctcctg tcactggtta tcaccctta ctgcaggttc    1020 agtgtcgtga agagaggccg gaagaagctg ctgtacatct tcaagcagcc tttcatgagg    1080
cccgtgcaga ctacccagga ggaagatgga tgcagctgta gattccctga gaggaggaa    1140 ggaggctgtg agctgagagt gaagttctcc cgaagcgcag atgccccagc ctatcagcag    1200
ggacagaatc agctgtacaa cgagctgaac ctgggaagac gggaggaata cgatgtgctg    1260
```

```
gacaaaaggc ggggcagaga tcctgagatg ggcggcaaac caagacggaa gaaccccag      1320
gaaggtctgt ataatgagct gcagaaagac aagatggctg aggcctactc agaaatcggg      1380
atgaagggcg aaagaaggag aggaaaaggc cacgacggac tgtaccaggg gctgagtaca      1440
gcaacaaaag acacctatga cgctctgcac atgcaggctc tgccaccaag acgagctaaa      1500
cgaggctcag gcgcgacgaa ctttagtttg ctgaagcaag ctggggatgt agaggaaaat      1560
ccgggtccca tgttgctcct tgtgacgagc ctcctgctct gcgagctgcc ccatccagcc      1620
ttcctcctca tcccgcggaa ggtgtgcaat ggcataggca ttggcgagtt taaagattct      1680
ctgagcataa atgctacgaa tattaagcat ttcaagaatt gtacttctat tagtggcgac      1740
ctccatattc ttccggttgc cttcagggt gactctttca cccacacacc tccattggat      1800
ccacaagaac ttgacatcct gaagacggtt aaagagatta caggcttcct ccttatccaa      1860
gcgtggcccg agaacagaac ggacttgcac gcctttgaga acctcgaaat aatacggggt      1920
cggacgaagc aacacggcca atttagcctt gcggttgtta gtctgaacat tacttctctc      1980
ggccttcgct ctttgaaaga aatcagcgac ggagatgtca tcattagtgg aaacaagaac      2040
ctgtgctacg cgaacacaat caactggaag aagctcttcg gtacttcagg ccaaaagaca      2100
aagattatta gtaacagagg agagaatagc tgtaaggcta ccggacaagt ttgtcacgcc      2160
ttgtgtagtc cagagggttg ctggggaccg gaaccaaggg attgcgtcag ttgccggaac      2220
gtgagtcgcg gacgcgagtg tgtggataag tgcaatcttc tggaagggga accgcgagag      2280
tttgtagaaa attccgaatg tatacagtgt catcccgagt gtcttccaca agcaatgaat      2340
atcacatgta cagggagggg tcctgataac tgtatccaat gtgcacacta catagatggt      2400
cctcactgtg taaagacgtg ccccgccgga gtaatgggtg aaaacaacac cctcgtgtgg      2460
aagtacgccg atgccgggca tgtctgtcat ttgtgtcatc ccaactgcac atatggctgt      2520
accggtcctg gattggaggg ctgtccaaca aacgggccga aaataccgag tatcgcaaca      2580
ggcatggtgg gagcactttt gcttctcctc gttgtcgccc tgggcatcgg cttgttcatg      2640
cgagctaaac gaggctcagg cgcgacgaac tttagtttgc tgaagcaagc tggggatgta      2700
gaggaaaatc cgggtcccat ggccagaccc caccctgt ggctgtgcgt gctgggaacc      2760
ctggtgggcc tgtctgccac ccccgctcct aagagctgcc ccgagagaca ctactgggcc      2820
cagggcaagc tgtgctgcca gatgtgcgaa cccggcacct ttctggtgaa agattgcgat      2880
cagcatagaa aggccgccca gtgtgacccc tgcatccccg agtgagctt cagcccagac      2940
catcacacca ggccccactg cgagagctgc agacactgca acagtggcct gctggtgaga      3000
aactgcacaa ttacagccaa cgctgagtgc gcctgcagaa atggatggca gtgcagagac      3060
aaggagtgca ccgaatgcga cccctgccc aaccccagcc tgacagcccg aagcagccag      3120
gccctgagcc ccatcccca gcctacccac ctgccctacg tgagtgagat gctggaagcc      3180
agaaccgccg ccacatgca gaccctggcc gacttcagac agctgccgc cagaaccctg      3240
agcacccact ggccccccca gagaagcctg tgcagcagcg actttatcag aatcctggtg      3300
atcttctctg gcatgttcct ggtgtttaca ctggccggcg ccctgtttct gcaccagaga      3360
cgcaagtacc gcagcaacaa gggagaaagc ccgtggagc cgctgagcc ctgcagatac      3420
tcctgcccca gagaggagga gggcagcacc attcccatcc aggaggacta cagaaaaccc      3480
gagcccgcct gcagcccatg a                                              3501
```

<210> SEQ ID NO 2
<211> LENGTH: 1166

<212> TYPE: PRT
<213> ORGANISM: Artificial Sequence
<220> FEATURE:
<223> OTHER INFORMATION: Synthesized

<400> SEQUENCE: 2

Met Ala Leu Pro Val Thr Ala Leu Leu Pro Leu Ala Leu Leu
1               5                   10                  15

His Ala Ala Arg Pro Asp Ile Val Leu Thr Gln Ser Pro Ala Leu Ala
        20                  25                  30

Val Ser Leu Gly Gln Arg Ala Thr Ile Ser Cys Arg Ala Ser Gln Ser
    35                  40                  45

Val Thr Ile Ser Gly Tyr Ser Phe Ile His Trp Tyr Gln Gln Lys Pro
50                  55                  60

Gly Gln Gln Pro Arg Leu Leu Ile Tyr Arg Ala Ser Asn Leu Ala Ser
65                  70                  75                  80

Gly Ile Pro Ala Arg Phe Ser Gly Ser Gly Ser Gly Thr Asp Phe Thr
                85                  90                  95

Leu Thr Ile Asn Pro Val Gln Ala Asp Asp Ile Ala Thr Tyr Phe Cys
                100                 105                 110

Gln Gln Ser Arg Lys Ser Pro Trp Thr Phe Ala Gly Gly Thr Lys Leu
            115                 120                 125

Glu Leu Arg Arg Thr Gly Gly Gly Gly Ser Gly Gly Gly Gly Ser Gly
130                 135                 140

Gly Gly Gly Ser Glu Val Gln Ile Leu Glu Thr Gly Gly Gly Leu Val
145                 150                 155                 160

Lys Pro Gly Gly Ser Leu Arg Leu Ser Cys Ala Thr Ser Gly Phe Asn
                165                 170                 175

Phe Asn Asp Tyr Phe Met Asn Trp Val Arg Gln Ala Pro Glu Lys Gly
            180                 185                 190

Leu Glu Trp Val Ala Gln Ile Arg Asn Lys Ile Tyr Thr Tyr Ala Thr
        195                 200                 205

Phe Tyr Ala Glu Ser Leu Glu Gly Arg Val Thr Ile Ser Arg Asp Asp
210                 215                 220

Ser Glu Ser Ser Val Tyr Leu Gln Val Ser Ser Leu Arg Ala Glu Asp
225                 230                 235                 240

Thr Ala Ile Tyr Tyr Cys Thr Arg Ser Leu Thr Gly Gly Asp Tyr Phe
                245                 250                 255

Asp Tyr Trp Gly Gln Gly Val Met Val Thr Val Ser Ser Thr Thr Thr
            260                 265                 270

Pro Ala Pro Arg Pro Pro Thr Pro Ala Pro Thr Ile Ala Ser Gln Pro
        275                 280                 285

Leu Ser Leu Arg Pro Glu Ala Cys Arg Pro Ala Ala Gly Gly Ala Val
290                 295                 300

His Thr Arg Gly Leu Asp Phe Ala Cys Asp Ile Tyr Ile Trp Ala Pro
305                 310                 315                 320

Leu Ala Gly Thr Cys Gly Val Leu Leu Leu Ser Leu Val Ile Thr Leu
                325                 330                 335

Tyr Cys Arg Phe Ser Val Val Lys Arg Gly Arg Lys Lys Leu Leu Tyr
            340                 345                 350

Ile Phe Lys Gln Pro Phe Met Arg Pro Val Gln Thr Thr Gln Glu Glu
        355                 360                 365

Asp Gly Cys Ser Cys Arg Phe Pro Glu Glu Glu Glu Gly Gly Cys Glu
370                 375                 380

-continued

```
Leu Arg Val Lys Phe Ser Arg Ser Ala Asp Ala Pro Ala Tyr Gln Gln
385                 390                 395                 400

Gly Gln Asn Gln Leu Tyr Asn Glu Leu Asn Leu Gly Arg Arg Glu Glu
            405                 410                 415

Tyr Asp Val Leu Asp Lys Arg Gly Arg Asp Pro Glu Met Gly Gly
            420                 425                 430

Lys Pro Arg Arg Lys Asn Pro Gln Glu Gly Leu Tyr Asn Glu Leu Gln
            435                 440                 445

Lys Asp Lys Met Ala Glu Ala Tyr Ser Glu Ile Gly Met Lys Gly Glu
450                 455                 460

Arg Arg Arg Gly Lys Gly His Asp Gly Leu Tyr Gln Gly Leu Ser Thr
465                 470                 475                 480

Ala Thr Lys Asp Thr Tyr Asp Ala Leu His Met Gln Ala Leu Pro Pro
                485                 490                 495

Arg Arg Ala Lys Arg Gly Ser Gly Ala Thr Asn Phe Ser Leu Leu Lys
                500                 505                 510

Gln Ala Gly Asp Val Glu Glu Asn Pro Gly Pro Met Leu Leu Leu Val
            515                 520                 525

Thr Ser Leu Leu Leu Cys Glu Leu Pro His Pro Ala Phe Leu Leu Ile
530                 535                 540

Pro Arg Lys Val Cys Asn Gly Ile Gly Ile Gly Glu Phe Lys Asp Ser
545                 550                 555                 560

Leu Ser Ile Asn Ala Thr Asn Ile Lys His Phe Lys Asn Cys Thr Ser
                565                 570                 575

Ile Ser Gly Asp Leu His Ile Leu Pro Val Ala Phe Arg Gly Asp Ser
                580                 585                 590

Phe Thr His Thr Pro Pro Leu Asp Pro Gln Glu Leu Asp Ile Leu Lys
                595                 600                 605

Thr Val Lys Glu Ile Thr Gly Phe Leu Leu Ile Gln Ala Trp Pro Glu
610                 615                 620

Asn Arg Thr Asp Leu His Ala Phe Glu Asn Leu Glu Ile Ile Arg Gly
625                 630                 635                 640

Arg Thr Lys Gln His Gly Gln Phe Ser Leu Ala Val Val Ser Leu Asn
                645                 650                 655

Ile Thr Ser Leu Gly Leu Arg Ser Leu Lys Glu Ile Ser Asp Gly Asp
                660                 665                 670

Val Ile Ile Ser Gly Asn Lys Asn Leu Cys Tyr Ala Asn Thr Ile Asn
            675                 680                 685

Trp Lys Lys Leu Phe Gly Thr Ser Gly Gln Lys Thr Lys Ile Ile Ser
690                 695                 700

Asn Arg Gly Glu Asn Ser Cys Lys Ala Thr Gly Gln Val Cys His Ala
705                 710                 715                 720

Leu Cys Ser Pro Glu Gly Cys Trp Gly Pro Glu Pro Arg Asp Cys Val
                725                 730                 735

Ser Cys Arg Asn Val Ser Arg Gly Arg Glu Cys Val Asp Lys Cys Asn
                740                 745                 750

Leu Leu Glu Gly Glu Pro Arg Glu Phe Val Glu Asn Ser Glu Cys Ile
            755                 760                 765

Gln Cys His Pro Glu Cys Leu Pro Gln Ala Met Asn Ile Thr Cys Thr
            770                 775                 780

Gly Arg Gly Pro Asp Asn Cys Ile Gln Cys Ala His Tyr Ile Asp Gly
785                 790                 795                 800

Pro His Cys Val Lys Thr Cys Pro Ala Gly Val Met Gly Glu Asn Asn
```

```
                      805                 810                 815
Thr Leu Val Trp Lys Tyr Ala Asp Ala Gly His Val Cys His Leu Cys
                820                 825                 830
His Pro Asn Cys Thr Tyr Gly Cys Thr Gly Pro Gly Leu Glu Gly Cys
                835                 840                 845
Pro Thr Asn Gly Pro Lys Ile Pro Ser Ile Ala Thr Gly Met Val Gly
850                 855                 860
Ala Leu Leu Leu Leu Leu Val Val Ala Leu Gly Ile Gly Leu Phe Met
865                 870                 875                 880
Arg Ala Lys Arg Gly Ser Gly Ala Thr Asn Phe Ser Leu Leu Lys Gln
                885                 890                 895
Ala Gly Asp Val Glu Glu Asn Pro Gly Pro Met Ala Arg Pro His Pro
                900                 905                 910
Trp Trp Leu Cys Val Leu Gly Thr Leu Val Gly Leu Ser Ala Thr Pro
                915                 920                 925
Ala Pro Lys Ser Cys Pro Glu Arg His Tyr Trp Ala Gln Gly Lys Leu
                930                 935                 940
Cys Cys Gln Met Cys Glu Pro Gly Thr Phe Leu Val Lys Asp Cys Asp
945                 950                 955                 960
Gln His Arg Lys Ala Ala Gln Cys Asp Pro Cys Ile Pro Gly Val Ser
                965                 970                 975
Phe Ser Pro Asp His His Thr Arg Pro His Cys Glu Ser Cys Arg His
                980                 985                 990
Cys Asn Ser Gly Leu Leu Val Arg Asn Cys Thr Ile Thr Ala Asn Ala
                995                 1000                1005
Glu Cys Ala Cys Arg Asn Gly Trp Gln Cys Arg Asp Lys Glu Cys
    1010                1015                1020
Thr Glu Cys Asp Pro Leu Pro Asn Pro Ser Leu Thr Ala Arg Ser
    1025                1030                1035
Ser Gln Ala Leu Ser Pro His Pro Gln Pro Thr His Leu Pro Tyr
    1040                1045                1050
Val Ser Glu Met Leu Glu Ala Arg Thr Ala Gly His Met Gln Thr
    1055                1060                1065
Leu Ala Asp Phe Arg Gln Leu Pro Ala Arg Thr Leu Ser Thr His
    1070                1075                1080
Trp Pro Pro Gln Arg Ser Leu Cys Ser Ser Asp Phe Ile Arg Ile
    1085                1090                1095
Leu Val Ile Phe Ser Gly Met Phe Leu Val Phe Thr Leu Ala Gly
    1100                1105                1110
Ala Leu Phe Leu His Gln Arg Arg Lys Tyr Arg Ser Asn Lys Gly
    1115                1120                1125
Glu Ser Pro Val Glu Pro Ala Glu Pro Cys Arg Tyr Ser Cys Pro
    1130                1135                1140
Arg Glu Glu Glu Gly Ser Thr Ile Pro Ile Gln Glu Asp Tyr Arg
    1145                1150                1155
Lys Pro Glu Pro Ala Cys Ser Pro
    1160                1165

<210> SEQ ID NO 3
<211> LENGTH: 2643
<212> TYPE: DNA
<213> ORGANISM: Artificial Sequence
<220> FEATURE:
<223> OTHER INFORMATION: Synthesized
```

<400> SEQUENCE: 3

```
atggctctgc ctgtgaccgc cctgctgctg cctctggctc tgctgctgca cgccgctcgg    60
cctgacattg tgctgaccca gagccccgcc ctggctgtga gcctgggaca gagagccacc   120
atcagctgca gagcctccca gagcgtgacc atcagcggat acagctttat ccactggtat   180
cagcagaagc ccggccagca gcctagactg ctgatctaca gagctagcaa cctggcctcc   240
ggcatccccg ccagattctc aggaagcggg agcggcaccg actttaccct gactatcaac   300
cccgtgcagg ctgacgacat cgccacctac ttctgccagc agtcccgcaa aagcccctgg   360
accttcgccg gcggcaccaa actggagctg agaagaaccg gcggcggggg ttctggtggc   420
ggcggcagcg gcggtggagg atcagaggtg cagattctgg agaccggagg cggactggtg   480
aagccaggag gaagcctgag actgagctgt gccacaagcg gattcaactt taatgattac   540
tttatgaact gggtgaggca ggctcccgag aagggcctgg agtgggtggc ccagattaga   600
aacaagatct acacctacgc cacctcctat gccgagagcc tggagggcag agtgaccatc   660
agcagagatg atagcgagtc aagcgtgtac ctgcaggtga gcagcctgag agccgaagac   720
accgccatct actactgcac caggagcctg accggaggcg actacttcga ttactgggga   780
caggggtga tggtgaccgt gagtagcact acaactccag cacccagacc cctacacct   840
gctccaacta tcgcaagtca gcccctgtca ctgcgccctg aagcctgtcg ccctgctgcc   900
ggggagctg tgcatactcg gggactggac tttgcctgtg atatctacat ctgggcgccc   960
ttggccggga cttgtggggt ccttctcctg tcactggtta tcaccctta ctgcaggttc  1020
agtgtcgtga agagaggccg gaagaagctg ctgtacatct tcaagcagcc tttcatgagg  1080
cccgtgcaga ctacccagga ggaagatgga tgcagctgta gattccctga agaggaggaa  1140
ggaggctgtg agctgagagt gaagttctcc cgaagcgcag atgccccagc ctatcagcag  1200
ggacagaatc agctgtacaa cgagctgaac ctgggaagac gggaggaata cgatgtgctg  1260
gacaaaaggc ggggcagaga tcctgagatg gcggcaaac caagacggaa gaaccccag  1320
gaaggtctgt ataatgagct gcagaaagac aagatggctg aggcctactc agaaatcggg  1380
atgaagggcg aaagaaggag aggaaaaggc cacgacggac tgtaccaggg gctgagtaca  1440
gcaacaaaag acacctatga cgctctgcac atgcaggctc tgccaccaag acgagctaaa  1500
cgaggctcag gcgcgacgaa ctttagtttg ctgaagcaag ctggggatgt agaggaaaat  1560
ccgggtccca tgttgctcct tgtgacgagc ctcctgctct gcgagctgcc ccatccagcc  1620
ttcctcctca tcccgcggaa ggtgtgcaat ggcataggca ttggcgagtt taaagattct  1680
ctgagcataa atgctacgaa tattaagcat ttcaagaatt gtacttctat tagtggcgac  1740
ctccatattc ttccggttgc cttcaggggt gactctttca cccacacacc tccattggat  1800
ccacaagaac ttgacatcct gaagacggtt aaagagatta caggcttcct ccttatccaa  1860
gcgtggcccg agaacagaac ggacttgcac gcctttgaga acctgaaat aatacggggt  1920
cggacgaagc aacacggcca atttagcctt gcggttgtta gtctgaacat tacttctctc  1980
ggccttcgct cttttgaaaga aatcagcgac ggagatgtca tcattagtgg aaacaagaac  2040
ctgtgctacg cgaacacaat caactggaag aagctcttcg gtacttcagg ccaaaagaca  2100
aagattatta gtaacagagg agagaatagc tgtaaggcta ccggacaagt tgtcacgcc  2160
tgtgtgtagtc cagagggttg ctggggaccg gaaccaaggg attgcgtcag ttgccggaac  2220
gtgagtcgcg gacgcgagtg tgtggataag tgcaatcttc tggaagggga accgcgagag  2280
tttgtagaaa attccgaatg tatacagtgt catcccgagt gtcttccaca agcaatgaat  2340
```

| | |
|---|---|
| atcacatgta cagggagggg tcctgataac tgtatccaat gtgcacacta catagatggt | 2400 |
| cctcactgtg taaagacgtg ccccgccgga gtaatgggtg aaaacaacac cctcgtgtgg | 2460 |
| aagtacgccg atgccgggca tgtctgtcat ttgtgtcatc ccaactgcac atatggctgt | 2520 |
| accggtcctg gattgaggg ctgtccaaca acgggccga aaataccgag tatcgcaaca | 2580 |
| ggcatggtgg gagcactttt gcttctcctc gttgtcgccc tgggcatcgg cttgttcatg | 2640 |
| tga | 2643 |

<210> SEQ ID NO 4
<211> LENGTH: 2634
<212> TYPE: DNA
<213> ORGANISM: Artificial Sequence
<220> FEATURE:
<223> OTHER INFORMATION: Synthesized

<400> SEQUENCE: 4

| | |
|---|---|
| atggctctgc ctgtgaccgc cctgctgctg cctctggctc tgctgctgca cgccgctcgg | 60 |
| cctagctacg tgctgaccca gccccctcc gtgagcgtgg cacctggaaa acagccaga | 120 |
| atctcctgcg gaggaaacaa catcggaacc aagaacgtgc actggtacca gcagaaaccc | 180 |
| ggacaggccc ccgtgctggt ggtgtacgcc gacagcgacc gcccagcgg aatcccagag | 240 |
| agattcagcg gcagcaacag cggaaacacc gccaccctga ccatcagcag agtgaagtg | 300 |
| ggagacgaag ccgactatta ttgccaggtg tgggactccg tgagctatca cgtggtgttc | 360 |
| ggcggaggaa caacactgac agtgctgggg ggcggcgggg gttctggtgg cggcggcagc | 420 |
| ggcggtggag gatcacaggt gcagctggtg aaagtggcg gcggcgtggt gcagcccgga | 480 |
| ggaagcctga gactgagctg cgccccagc ggcttcgtgt tcagatccta tggcatgcac | 540 |
| tgggtgagac agacacctgg caaagggctg gagtgggtga gtctgatttg gcacgacggc | 600 |
| agcaaccggt tctacgccga cagcgtgaag ggcagattca ccattagcag agacaacagc | 660 |
| aaaaacacac tgtatctgca gatgaacagc ctgagagccg aagacaccgc catgtatttc | 720 |
| tgcgctaggg agagactgat cgccgcccct gccgccttcg acctgtgggg acagggcacc | 780 |
| ctggtgaccg tgtccagcac tacaactcca gcacccagac cccctacacc tgctccaact | 840 |
| atcgcaagtc agcccctgtc actgcgcccct gaagcctgtc gccctgctgc cggggagct | 900 |
| gtgcatactc ggggactgga cttttgcctgt gatatctaca tctgggcgcc cttggccggg | 960 |
| acttgtgggg tccttctcct gtcactggtt atcaccctt actgcaggtt cagtgtcgtg | 1020 |
| aagagaggcc ggaagaagct gctgtacatc ttcaagcagc cttttcatga gcccgtgcag | 1080 |
| actacccagg aggaagatgg atgcagctgt agattccctg aagaggagga aggaggctgt | 1140 |
| gagctgagag tgaagttctc ccgaagcgca gatgcccag cctatcagca gggacagaat | 1200 |
| cagctgtaca acgagctgaa cctgggaaga cgggaggaat acgatgtgct ggacaaaagg | 1260 |
| cggggcagag atcctgagat gggcggcaaa ccaagacgga gaaccccca ggaaggtctg | 1320 |
| tataatgagc tgcagaaaga caagatggct gaggcctact cagaaatcgg gatgaagggc | 1380 |
| gaaagaagga gggaaaagg ccacgacgga ctgtaccagg gctgagtac agcaacaaaa | 1440 |
| gacacctatg acgtctgca catgcaggct ctgccaccaa gacgagctaa acgaggctca | 1500 |
| ggcgcgacga actttagttt gctgaagcaa gctgggatg tagaggaaaa tccgggtccc | 1560 |
| atgttgctcc ttgtgacgag cctcctgctc tgcgagctgc cccatccagc cttcctcctc | 1620 |
| atcccgcgga aggtgtgcaa tggcataggc attggcgagt ttaaagattc tctgagcata | 1680 |

-continued

| | |
|---|---|
| aatgctacga atattaagca tttcaagaat tgtacttcta ttagtggcga cctccatatt | 1740 |
| cttccggttg ccttcagggg tgactctttc acccacacac ctccattgga tccacaagaa | 1800 |
| cttgacatcc tgaagacggt taaagagatt acaggcttcc tccttatcca agcgtggccc | 1860 |
| gagaacagaa cggacttgca cgcctttgag aacctcgaaa taatacgggg tcggacgaag | 1920 |
| caacacggcc aatttagcct tgcggttgtt agtctgaaca ttacttctct cggccttcgc | 1980 |
| tctttgaaag aaatcagcga cggagatgtc atcattagtg gaaacaagaa cctgtgctac | 2040 |
| gcgaacacaa tcaactggaa gaagctcttc ggtacttcag gccaaaagac aaagattatt | 2100 |
| agtaacagag gagagaatag ctgtaaggct accggacaag tttgtcacgc cttgtgtagt | 2160 |
| ccagagggtt gctggggacc ggaaccaagg gattgcgtca gttgccggaa cgtgagtcgc | 2220 |
| ggacgcgagt gtgtggataa gtgcaatctt ctggaagggg aaccgcgaga gtttgtagaa | 2280 |
| aattccgaat gtatacagtg tcatcccgag tgtcttccac aagcaatgaa tatcacatgt | 2340 |
| acagggaggg gtcctgataa ctgtatccaa tgtgcacact acatagatgg tcctcactgt | 2400 |
| gtaaagacgt gccccgccgg agtaatgggt gaaaacaaca ccctcgtgtg gaagtacgcc | 2460 |
| gatgccgggc atgtctgtca tttgtgtcat cccaactgca catatggctg taccggtcct | 2520 |
| ggattggagg gctgtccaac aaacgggccg aaaataccga gtatcgcaac aggcatggtg | 2580 |
| ggagcacttt tgcttctcct cgttgtcgcc ctgggcatcg gcttgttcat gtga | 2634 |

<210> SEQ ID NO 5
<211> LENGTH: 2337
<212> TYPE: DNA
<213> ORGANISM: Artificial Sequence
<220> FEATURE:
<223> OTHER INFORMATION: Synthesized

<400> SEQUENCE: 5

| | |
|---|---|
| atggctctgc ctgtgaccgc cctgctgctg cctctggctc tgctgctgca cgccgctcgg | 60 |
| cctgacatcg ttttgacaca atctcctgcg tcattggcca tgagtctcgg gaagcgcgca | 120 |
| acaatatcct gtcgcgccag tgaatctgtg tctgtgatag gagcgcactt gatccattgg | 180 |
| tatcagcaga aacctggaca acctcccaag ctgctcatct acctcgccag taaccttgaa | 240 |
| acaggagtac ctgctcggtt ttcaggttcc gggtcaggga cggatttcac tttgactatc | 300 |
| gacccagttg aggaagacga cgtagccata tatagctgcc tgcagtctcg gatcttcccg | 360 |
| cgcacgttcg ggggaggaac taagctggag attaagggcg gcggggttc tggtggcggc | 420 |
| ggcagcggcg gtggaggatc acaaatccaa ctggttcagt ccggtccaga actgaaaaag | 480 |
| ccgggggaga cggtgaaaat ctcctgtaag gcctcaggtt ataccttcac cgattacagc | 540 |
| atcaattggg taaagcggc tccagggaaa ggtctgaaat ggatgggttg gatcaacaca | 600 |
| gaaacccgag aaccagccta tgcttacgac tttcgaggtc gattcgcttt tccttggaa | 660 |
| acttccgcaa gcacagccta tctgcaaatc aacaatctca gtacgaaga tacggccacg | 720 |
| tatttttgtg ccctggatta cagctatgca atggattact ggggtcaggg acgtctgtt | 780 |
| acagtttcta gtactacaac tccagcaccc agacccccta cacctgctcc aactatcgca | 840 |
| agtcagcccc tgtcactgcg ccctgaagcc tgtcgccctg ctgccggggg agctgtgcat | 900 |
| actcggggac tggactttgc ctgtgatatc tacatctggg cgcccttggc cgggacttgt | 960 |
| ggggtccttc tcctgtcact ggttatcacc ctttactgca ggttcagtgt cgtgaagaga | 1020 |
| ggccggaaga agctgctgta catcttcaag cagccttttc tgaggcccgt gcagactacc | 1080 |
| caggaggaag atggatgcag ctgtagattc cctgaagagg aggaaggagg ctgtgagctg | 1140 |

-continued

```
agagtgaagt tctcccgaag cgcagatgcc ccagcctatc agcagggaca gaatcagctg    1200
tacaacgagc tgaacctggg aagacgggag gaatacgatg tgctggacaa aaggcggggc    1260
agagatcctg agatgggcgg caaaccaaga cggaagaacc cccaggaagg tctgtataat    1320
gagctgcaga aagacaagat ggctgaggcc tactcagaaa tcgggatgaa gggcgaaaga    1380
aggagaggaa aaggccacga cggactgtac caggggctga gtacagcaac aaaagacacc    1440
tatgacgctc tgcacatgca ggctctgcca ccaagacgag ctaaacgagg ctcaggcgcg    1500
acgaacttta gtttgctgaa gcaagctggg gatgtagagg aaaatccggg tcccatggcc    1560
agaccccacc cctggtggct gtgcgtgctg gaaccctggg tgggcctgtc tgccaccccc    1620
gctcctaaga gctgccccga gagacactac tgggcccagg gcaagctgtg ctgccagatg    1680
tgcgaacccg gcacctttct ggtgaaagat tgcgatcagc atagaaaggc cgcccagtgt    1740 gaccctgca tccccggagt gagcttcagc ccagaccatc acaccaggcc ccactgcgag    1800
agctgcagac actgcaacag tggcctgctg gtgagaaact gcacaattac agccaacgct    1860
gagtgcgcct gcagaaatgg atggcagtgc agagacaagg agtgcaccga atgcgacccc    1920
ctgcccaacc ccagcctgac agcccgaagc agccaggccc tgagccccca tccccagcct    1980
acccacctgc cctacgtgag tgagatgctg gaagccagaa ccgccggcca catgcagacc    2040
ctggccgact tcagacagct gcccgccaga accctgagca cccactggcc ccccagaga    2100 agcctgtgca gcagcgactt tatcagaatc ctggtgatct tctctggcat gttcctggtg    2160
tttacactgg ccggcgccct gtttctgcac cagagacgca agtaccgcag caacaaggga    2220
gaaagccccg tggagcccgc tgagccctgc agatactcct gccccagaga ggaggagggc    2280
agcaccattc ccatccagga ggactacaga aaacccgagc ccgcctgcag cccatga       2337
```

<210> SEQ ID NO 6
<211> LENGTH: 778
<212> TYPE: PRT
<213> ORGANISM: Artificial Sequence
<220> FEATURE:
<223> OTHER INFORMATION: Synthesized

<400> SEQUENCE: 6

```
Met Ala Leu Pro Val Thr Ala Leu Leu Leu Pro Leu Ala Leu Leu Leu
1               5                   10                  15

His Ala Ala Arg Pro Asp Ile Val Leu Thr Gln Ser Pro Ala Ser Leu
                20                  25                  30

Ala Met Ser Leu Gly Lys Arg Ala Thr Ile Ser Cys Arg Ala Ser Glu
            35                  40                  45

Ser Val Ser Val Ile Gly Ala His Leu Ile His Trp Tyr Gln Gln Lys
        50                  55                  60

Pro Gly Gln Pro Pro Lys Leu Leu Ile Tyr Leu Ala Ser Asn Leu Glu
65                  70                  75                  80

Thr Gly Val Pro Ala Arg Phe Ser Gly Ser Gly Ser Gly Thr Asp Phe
                85                  90                  95

Thr Leu Thr Ile Asp Pro Val Glu Glu Asp Asp Val Ala Ile Tyr Ser
                100                 105                 110

Cys Leu Gln Ser Arg Ile Phe Pro Arg Thr Phe Gly Gly Gly Thr Lys
            115                 120                 125

Leu Glu Ile Lys Gly Gly Gly Gly Ser Gly Gly Gly Gly Ser Gly Gly
        130                 135                 140

Gly Gly Ser Gln Ile Gln Leu Val Gln Ser Gly Pro Glu Leu Lys Lys
```

```
            145                 150                 155                 160
        Pro Gly Glu Thr Val Lys Ile Ser Cys Lys Ala Ser Gly Tyr Thr Phe
                        165                 170                 175

Thr Asp Tyr Ser Ile Asn Trp Val Lys Arg Ala Pro Gly Lys Gly Leu
                        180                 185                 190

Lys Trp Met Gly Trp Ile Asn Thr Glu Thr Arg Glu Pro Ala Tyr Ala
                        195                 200                 205

Tyr Asp Phe Arg Gly Arg Phe Ala Phe Ser Leu Glu Thr Ser Ala Ser
                        210                 215                 220

Thr Ala Tyr Leu Gln Ile Asn Asn Leu Lys Tyr Glu Asp Thr Ala Thr
        225                 230                 235                 240

Tyr Phe Cys Ala Leu Asp Tyr Ser Tyr Ala Met Asp Tyr Trp Gly Gln
                        245                 250                 255

Gly Thr Ser Val Thr Val Ser Ser Thr Thr Pro Ala Pro Arg Pro Pro
                        260                 265                 270

Pro Thr Pro Ala Pro Thr Ile Ala Ser Gln Pro Leu Ser Leu Arg Pro
                        275                 280                 285

Glu Ala Cys Arg Pro Ala Ala Gly Gly Ala Val His Thr Arg Gly Leu
                        290                 295                 300

Asp Phe Ala Cys Asp Ile Tyr Ile Trp Ala Pro Leu Ala Gly Thr Cys
        305                 310                 315                 320

Gly Val Leu Leu Leu Ser Leu Val Ile Thr Leu Tyr Cys Arg Phe Ser
                        325                 330                 335

Val Val Lys Arg Gly Arg Lys Lys Leu Leu Tyr Ile Phe Lys Gln Pro
                        340                 345                 350

Phe Met Arg Pro Val Gln Thr Thr Gln Glu Glu Asp Gly Cys Ser Cys
                        355                 360                 365

Arg Phe Pro Glu Glu Glu Glu Gly Gly Cys Glu Leu Arg Val Lys Phe
                        370                 375                 380

Ser Arg Ser Ala Asp Ala Pro Ala Tyr Gln Gln Gly Gln Asn Gln Leu
        385                 390                 395                 400

Tyr Asn Glu Leu Asn Leu Gly Arg Arg Glu Glu Tyr Asp Val Leu Asp
                        405                 410                 415

Lys Arg Arg Gly Arg Asp Pro Glu Met Gly Gly Lys Pro Arg Arg Lys
                        420                 425                 430

Asn Pro Gln Glu Gly Leu Tyr Asn Glu Leu Gln Lys Asp Lys Met Ala
                        435                 440                 445

Glu Ala Tyr Ser Glu Ile Gly Met Lys Gly Glu Arg Arg Arg Gly Lys
                        450                 455                 460

Gly His Asp Gly Leu Tyr Gln Gly Leu Ser Thr Ala Thr Lys Asp Thr
        465                 470                 475                 480

Tyr Asp Ala Leu His Met Gln Ala Leu Pro Pro Arg Arg Ala Lys Arg
                        485                 490                 495

Gly Ser Gly Ala Thr Asn Phe Ser Leu Leu Lys Gln Ala Gly Asp Val
                        500                 505                 510

Glu Glu Asn Pro Gly Pro Met Ala Arg Pro His Pro Trp Trp Leu Cys
                        515                 520                 525

Val Leu Gly Thr Leu Val Gly Leu Ser Ala Thr Pro Ala Pro Lys Ser
                        530                 535                 540

Cys Pro Glu Arg His Tyr Trp Ala Gln Gly Lys Leu Cys Cys Gln Met
        545                 550                 555                 560

Cys Glu Pro Gly Thr Phe Leu Val Lys Asp Cys Asp Gln His Arg Lys
                        565                 570                 575
```

```
Ala Ala Gln Cys Asp Pro Cys Ile Pro Gly Val Ser Phe Ser Pro Asp
            580                 585                 590

His His Thr Arg Pro His Cys Glu Ser Cys Arg His Cys Asn Ser Gly
        595                 600                 605

Leu Leu Val Arg Asn Cys Thr Ile Thr Ala Asn Ala Glu Cys Ala Cys
    610                 615                 620

Arg Asn Gly Trp Gln Cys Arg Asp Lys Glu Cys Thr Glu Cys Asp Pro
625                 630                 635                 640

Leu Pro Asn Pro Ser Leu Thr Ala Arg Ser Ser Gln Ala Leu Ser Pro
                645                 650                 655

His Pro Gln Pro Thr His Leu Pro Tyr Val Ser Glu Met Leu Glu Ala
            660                 665                 670

Arg Thr Ala Gly His Met Gln Thr Leu Ala Asp Phe Arg Gln Leu Pro
        675                 680                 685

Ala Arg Thr Leu Ser Thr His Trp Pro Pro Gln Arg Ser Leu Cys Ser
    690                 695                 700

Ser Asp Phe Ile Arg Ile Leu Val Ile Phe Ser Gly Met Phe Leu Val
705                 710                 715                 720

Phe Thr Leu Ala Gly Ala Leu Phe Leu His Gln Arg Arg Lys Tyr Arg
                725                 730                 735

Ser Asn Lys Gly Glu Ser Pro Val Glu Pro Ala Glu Pro Cys Arg Tyr
            740                 745                 750

Ser Cys Pro Arg Glu Glu Glu Gly Ser Thr Ile Pro Ile Gln Glu Asp
        755                 760                 765

Tyr Arg Lys Pro Glu Pro Ala Cys Ser Pro
    770                 775

<210> SEQ ID NO 7
<211> LENGTH: 1479
<212> TYPE: DNA
<213> ORGANISM: Artificial Sequence
<220> FEATURE:
<223> OTHER INFORMATION: Synthesized

<400> SEQUENCE: 7
atggctctgc ctgtgaccgc cctgctgctg cctctggctc tgctgctgca cgccgctcgg      60
cctgacatcg ttttgacaca atctcctgcg tcattggcca tgagtctcgg aagcgcgca     120 acaatatcct gtcgcgccag tgaatctgtg tctgtgatag agcgcacttt gatccattgg     180
tatcagcaga aacctggaca acctcccaag ctgctcatct acctcgccag taaccttgaa     240
acaggagtac ctgctcggtt ttcaggttcc gggtcaggga cggatttcac tttgactatc     300
gacccagttg aggaagacga cgtagccata tatagctgcc tgcagtctcg gatcttcccg     360
cgcacgttcg ggggaggaac taagctggag attaagggcg gcggggttc tggtggcggc      420 ggcagcggcg gtgaggatca caaatccaa ctggttcagt ccggtccaga actgaaaaag     480
ccgggggaga cggtgaaaat ctcctgtaag gcctcaggtt ataccttcac cgattacagc     540
atcaattggg taaagcgggc tccagggaaa ggtctgaaat ggatggttg atcaacaca       600 gaaacccgag aaccagccta tgcttacgac tttcgaggtc gattcgcttt ttccttggaa     660
acttccgcaa gcacagccta tctgcaaatc aacaatctca gtacgaaga tacggccacg      720 tatttttgtg ccctggatta cagctatgca atggattact ggggtcaggg gacgtctgtt     780 acagttttcta gtactacaac tccagcaccc agaccccta cacctgctcc aactatcgca     840
agtcagcccc tgtcactgcg ccctgaagcc tgtcgccctg ctgccgggg agctgtgcat      900
```

-continued

```
actcggggac tggactttgc ctgtgatatc tacatctggg cgcccttggc cgggacttgt      960
ggggtccttc tcctgtcact ggttatcacc ctttactgca ggttcagtgt cgtgaagaga     1020
ggccggaaga agctgctgta catcttcaag cagccttttca tgaggcccgt gcagactacc    1080
caggaggaag atggatgcag ctgtagattc cctgaagagg aggaaggagg ctgtgagctg     1140
agagtgaagt tctcccgaag cgcagatgcc ccagcctatc agcagggaca gaatcagctg     1200
tacaacgagc tgaacctggg aagacgggag gaatacgatg tgctggacaa aaggcggggc     1260
agagatcctg agatgggcgg caaaccaaga cggaagaacc cccaggaagg tctgtataat     1320
gagctgcaga aagacaagat ggctgaggcc tactcagaaa tcgggatgaa gggcgaaaga     1380
aggagaggaa aaggccacga cggactgtac caggggctga gtacagcaac aaaagacacc     1440
tatgacgctc tgcacatgca ggctctgcca ccaagatga                            1479
```

<210> SEQ ID NO 8
<211> LENGTH: 2349
<212> TYPE: DNA
<213> ORGANISM: Artificial Sequence
<220> FEATURE:
<223> OTHER INFORMATION: Synthesized

<400> SEQUENCE: 8

```
atggctctgc ctgtgaccgc cctgctgctg cctctggctc tgctgctgca cgccgctcgg      60
cctgacattg tgatgagcca gagcccctcc tccctggcag tgagcgtggg agaaaaagtg     120
accatgagct gcaagagcag ccagaacctg ttttacagca ccaaccagaa aaactacctg     180
gcctggtacc agcagaagcc cggccagtct cccaagctgc tgatttattg gccagcaca     240 agagagagcg gcgtgcccga cagattcacc ggaagcggca cggaacagc cttcaccctg     300 actatcagca gcgtgaaagc tgaggacctg gccgtgtact actgtcagca gtactacaac     360
tacccactga ccttcggcgc aggcaccaag ctggagctga agggcggcgg gggttctggt     420
ggcggcggca gcggcggtgg aggatcagag gtgaacctgg aggagagcgg ggggggctg     480 gtgcagcctg gaggaagtat gaagctgagc tgtattgcca gcggattcac atttagcaac     540
tattggatga actgggtgag gcagagtccc gagaaggac tggagtgggt ggcagaaatt     600
agactgaagt caacaactac cgccacacac tacgcagaaa gcgtgaaggg agagattcacc    660 atcagcagag acgatagcaa gagcaccgtg tacctgcaga tgaacaatct gagagccgag    720
gacaccggga tctactactg taccggcaca agatacggaa gcagcctgga ctactggggc    780
caggggacaa gcgtgacagt gagctccact acaactccag cacccagacc cctacacct   840 gctccaacta tcgcaagtca gccctgtca ctgcgccctg aagcctgtcg ccctgctgcc     900 ggggagctg tgcatactcg gggactggac tttgcctgtg atatctacat ctgggcgccc    960
ttggccggga cttgtggggt ccttctcctg tcactggtta tcacccttta ctgcaggttc   1020
agtgtcgtga agagaggccg gaagaagctg ctgtacatct tcaagcagcc tttcatgagg   1080
cccgtgcaga ctacccagga ggaagatgga tgcagctgta gattccctga agaggaggaa   1140
ggaggctgtg agctgagagt gaagttctcc cgaagcgcag atgccccagc ctatcagcag   1200
ggacagaatc agctgtacaa cgagctgaac ctgggaagac gggaggaata cgatgtgctg   1260
gacaaaaggc ggggcagaga tcctgagatg ggcggcaaac caagacggaa gaaccccag   1320 gaaggtctgt ataatgagct gcagaaagac aagatggctg aggcctactc agaaatcggg   1380
atgaagggcg aaagaaggag aggaaaaggc cacgacggac tgtaccaggg gctgagtaca   1440
```

| | |
|---|---:|
| gcaacaaaag acacctatga cgctctgcac atgcaggctc tgccaccaag acgagctaaa | 1500 |
| cgaggctcag gcgcgacgaa ctttagtttg ctgaagcaag ctggggatgt agaggaaaat | 1560 |
| ccgggtccca tggccagacc ccacccctgg tggctgtgcg tgctgggaac cctggtgggc | 1620 |
| ctgtctgcca cccccgctcc taagagctgc cccgagagac actactgggc cagggcaag | 1680 |
| ctgtgctgcc agatgtgcga acccggcacc tttctggtga agattgcga tcagcataga | 1740 |
| aaggccgccc agtgtgaccc ctgcatcccc ggagtgagct tcagcccaga ccatcacacc | 1800 |
| aggcccact gcgagagctg cagacactgc aacagtggcc tgctggtgag aaactgcaca | 1860 |
| attacagcca cgctgagtg cgcctgcaga aatggatggc agtgcagaga caaggagtgc | 1920 |
| accgaatgcg acccctgcc caaccccagc ctgacagccc gaagcagcca ggccctgagc | 1980 |
| ccccatcccc agcctaccca cctgccctac gtgagtgaga tgctggaagc cagaaccgcc | 2040 |
| ggccacatgc agaccctggc cgacttcaga cagctgcccg ccagaaccct gagcacccac | 2100 |
| tggcccccc agagaagcct gtgcagcagc gactttatca gaatcctggt gatcttctct | 2160 |
| ggcatgttcc tggtgtttac actggccggc gccctgtttc tgcaccagag acgcaagtac | 2220 |
| cgcagcaaca agggagaaag ccccgtggag cccgctgagc cctgcagata ctcctgcccc | 2280 |
| agagaggagg agggcagcac cattcccatc caggaggact acagaaaacc cgagcccgcc | 2340 |
| tgcagccca | 2349 |

<210> SEQ ID NO 9
<211> LENGTH: 783
<212> TYPE: PRT
<213> ORGANISM: Artificial Sequence
<220> FEATURE:
<223> OTHER INFORMATION: Synthesized

<400> SEQUENCE: 9

```
Met Ala Leu Pro Val Thr Ala Leu Leu Leu Pro Leu Ala Leu Leu Leu
1               5                   10                  15

His Ala Ala Arg Pro Asp Ile Val Met Ser Gln Ser Pro Ser Ser Leu
            20                  25                  30

Ala Val Ser Val Gly Glu Lys Val Thr Met Ser Cys Lys Ser Ser Gln
        35                  40                  45

Asn Leu Phe Tyr Ser Thr Asn Gln Lys Asn Tyr Leu Ala Trp Tyr Gln
    50                  55                  60

Gln Lys Pro Gly Gln Ser Pro Lys Leu Leu Ile Tyr Trp Ala Ser Thr
65                  70                  75                  80

Arg Glu Ser Gly Val Pro Asp Arg Phe Thr Gly Ser Gly Ser Gly Thr
                85                  90                  95

Ala Phe Thr Leu Thr Ile Ser Ser Val Lys Ala Glu Asp Leu Ala Val
            100                 105                 110

Tyr Tyr Cys Gln Gln Tyr Tyr Asn Tyr Pro Leu Thr Phe Gly Ala Gly
        115                 120                 125

Thr Lys Leu Glu Leu Lys Gly Gly Gly Ser Gly Gly Gly Ser
    130                 135                 140

Gly Gly Gly Gly Ser Glu Val Asn Leu Glu Glu Ser Gly Gly Gly Leu
145                 150                 155                 160

Val Gln Pro Gly Gly Ser Met Lys Leu Ser Cys Ile Ala Ser Gly Phe
                165                 170                 175

Thr Phe Ser Asn Tyr Trp Met Asn Trp Val Arg Gln Ser Pro Glu Lys
            180                 185                 190

Gly Leu Glu Trp Val Ala Glu Ile Arg Leu Lys Tyr Asn Asn Tyr Ala
```

```
              195                 200                 205
Thr His Tyr Ala Glu Ser Val Lys Gly Arg Phe Thr Ile Ser Arg Asp
    210                 215                 220

Asp Ser Lys Ser Thr Val Tyr Leu Gln Met Asn Asn Leu Arg Ala Glu
225                 230                 235                 240

Asp Thr Gly Ile Tyr Tyr Cys Thr Gly Thr Arg Tyr Gly Ser Ser Leu
                245                 250                 255

Asp Tyr Trp Gly Gln Gly Thr Ser Val Thr Val Ser Ser Thr Thr Thr
            260                 265                 270

Pro Ala Pro Arg Pro Pro Thr Pro Ala Pro Thr Ile Ala Ser Gln Pro
        275                 280                 285

Leu Ser Leu Arg Pro Glu Ala Cys Arg Pro Ala Ala Gly Gly Ala Val
    290                 295                 300

His Thr Arg Gly Leu Asp Phe Ala Cys Asp Ile Tyr Ile Trp Ala Pro
305                 310                 315                 320

Leu Ala Gly Thr Cys Gly Val Leu Leu Leu Ser Leu Val Ile Thr Leu
                325                 330                 335

Tyr Cys Arg Phe Ser Val Val Lys Arg Gly Arg Lys Lys Leu Leu Tyr
            340                 345                 350

Ile Phe Lys Gln Pro Phe Met Arg Pro Val Gln Thr Thr Gln Glu Glu
        355                 360                 365

Asp Gly Cys Ser Cys Arg Phe Pro Glu Glu Glu Glu Gly Gly Cys Glu
    370                 375                 380

Leu Arg Val Lys Phe Ser Arg Ser Ala Asp Ala Pro Ala Tyr Gln Gln
385                 390                 395                 400

Gly Gln Asn Gln Leu Tyr Asn Glu Leu Asn Leu Gly Arg Arg Glu Glu
                405                 410                 415

Tyr Asp Val Leu Asp Lys Arg Arg Gly Arg Asp Pro Glu Met Gly Gly
            420                 425                 430

Lys Pro Arg Arg Lys Asn Pro Gln Glu Gly Leu Tyr Asn Glu Leu Gln
        435                 440                 445

Lys Asp Lys Met Ala Glu Ala Tyr Ser Glu Ile Gly Met Lys Gly Glu
    450                 455                 460

Arg Arg Arg Gly Lys Gly His Asp Gly Leu Tyr Gln Gly Leu Ser Thr
465                 470                 475                 480

Ala Thr Lys Asp Thr Tyr Asp Ala Leu His Met Gln Ala Leu Pro Pro
                485                 490                 495

Arg Arg Ala Lys Arg Gly Ser Gly Ala Thr Asn Phe Ser Leu Leu Lys
            500                 505                 510

Gln Ala Gly Asp Val Glu Glu Asn Pro Gly Pro Met Ala Arg Pro His
        515                 520                 525

Pro Trp Trp Leu Cys Val Leu Gly Thr Leu Val Gly Leu Ser Ala Thr
    530                 535                 540

Pro Ala Pro Lys Ser Cys Pro Glu Arg His Tyr Trp Ala Gln Gly Lys
545                 550                 555                 560

Leu Cys Cys Gln Met Cys Glu Pro Gly Thr Phe Leu Val Lys Asp Cys
                565                 570                 575

Asp Gln His Arg Lys Ala Ala Gln Cys Asp Pro Cys Ile Pro Gly Val
            580                 585                 590

Ser Phe Ser Pro Asp His His Thr Arg Pro His Cys Glu Ser Cys Arg
        595                 600                 605

His Cys Asn Ser Gly Leu Leu Val Arg Asn Cys Thr Ile Thr Ala Asn
    610                 615                 620
```

-continued

```
Ala Glu Cys Ala Cys Arg Asn Gly Trp Gln Cys Arg Asp Lys Glu Cys
625                 630                 635                 640

Thr Glu Cys Asp Pro Leu Pro Asn Pro Ser Leu Thr Ala Arg Ser Ser
            645                 650                 655

Gln Ala Leu Ser Pro His Pro Gln Pro Thr His Leu Pro Tyr Val Ser
        660                 665                 670

Glu Met Leu Glu Ala Arg Thr Ala Gly His Met Gln Thr Leu Ala Asp
    675                 680                 685

Phe Arg Gln Leu Pro Ala Arg Thr Leu Ser Thr His Trp Pro Pro Gln
690                 695                 700

Arg Ser Leu Cys Ser Ser Asp Phe Ile Arg Ile Leu Val Ile Phe Ser
705                 710                 715                 720

Gly Met Phe Leu Val Phe Thr Leu Ala Gly Ala Leu Phe Leu His Gln
                725                 730                 735

Arg Arg Lys Tyr Arg Ser Asn Lys Gly Glu Ser Pro Val Glu Pro Ala
            740                 745                 750

Glu Pro Cys Arg Tyr Ser Cys Pro Arg Glu Glu Glu Gly Ser Thr Ile
        755                 760                 765

Pro Ile Gln Glu Asp Tyr Arg Lys Pro Glu Pro Ala Cys Ser Pro
    770                 775                 780
```

<210> SEQ ID NO 10
<211> LENGTH: 1515
<212> TYPE: DNA
<213> ORGANISM: Artificial Sequence
<220> FEATURE:
<223> OTHER INFORMATION: Synthesized

<400> SEQUENCE: 10

```
atggctctgc ctgtgaccgc cctgctgctg cctctggctc tgctgctgca cgccgctcgg      60
cctgacattg tgatgagcca gagcccctcc tccctggcag tgagcgtggg agaaaaagtg     120
accatgagct gcaagagcag ccagaacctg ttttacagca ccaaccagaa aaactacctg     180
gcctggtacc agcagaagcc cggccagtct cccaagctgc tgatttattg gccagcaca      240 agagagagcg gcgtgcccga cagattcacc ggaagcggca gcggaacagc cttcaccctg     300
actatcagca gcgtgaaagc tgaggacctg gccgtgtact actgtcagca gtactacaac     360
tacccactga ccttcggcgc aggcaccaag ctggagctga aggcggcgg gggttctggt      420 ggcggcggca gcggcggtgg aggatcagag gtgaacctgg aggagagcgg ggggggctg      480 gtgcagcctg aggaagtat gaagctgagc tgtattgcca gcggattcac atttagcaac      540
tattggatga actgggtgag gcagagtccc gagaagggac tggagtgggt ggcagaaatt     600
agactgaagt acaacaacta cgccacacac tacgcagaaa gcgtgaaggg agattcacc      660 atcagcagag acgatagcaa gagcaccgtg tacctgcaga tgaacaatct gagagccgag     720
gacaccggga tctactactg taccggcaca agatacggaa gcagcctgga ctactggggc     780
caggggacaa gcgtgacagt gagctccact acaactccag cacccagacc cctacacct     840 gctccaacta tcgcaagtca gccctgtca ctgcgccctg aagcctgtcg ccctgctgcc     900
gggggagctg tgcatactcg gggactggac tttgcctgtg atatctacat ctgggcgccc     960
ttggccggga cttgtggggt ccttctcctg tcactggtta tcaccctta ctgcaggttc    1020 agtgtcgtga agagaggccg gaagaagctg ctgtacatct tcaagcagcc tttcatgagg    1080
cccgtgcaga ctacccagga ggaagatgga tgcagctgta gattccctga agaggaggaa    1140
```

-continued

```
ggaggctgtg agctgagagt gaagttctcc cgaagcgcag atgccccagc ctatcagcag    1200
ggacagaatc agctgtacaa cgagctgaac ctgggaagac gggaggaata cgatgtgctg    1260
gacaaaaggc ggggcagaga tcctgagatg ggcggcaaac caagacggaa gaacccccag    1320
gaaggtctgt ataatgagct gcagaaagac aagatggctg aggcctactc agaaatcggg    1380
atgaagggcg aaagaaggag aggaaaaggc cacgacggac tgtaccaggg gctgagtaca    1440
gcaacaaaag acacctatga cgctctgcac atgcaggctc tgccaccaag acgagctaaa    1500
cgaggctcag gctga                                                     1515
```